US006185307B1

(12) United States Patent
Johnson, Jr.

(10) Patent No.: US 6,185,307 B1
(45) Date of Patent: Feb. 6, 2001

(54) CRYPTOGRAPHY SECURITY FOR REMOTE DISPENSER TRANSACTIONS

(75) Inventor: William S. Johnson, Jr., Jamestown, NC (US)

(73) Assignee: Gilbarco Inc., Greensboro, NC (US)

( * ) Notice: Under 35 U.S.C. 154(b), the term of this patent shall be extended for 0 days.

(21) Appl. No.: 09/006,245

(22) Filed: Jan. 13, 1998

Related U.S. Application Data

(62) Division of application No. 08/895,417, filed on Jul. 16, 1997.

(51) Int. Cl.[7] .................................................... H04L 9/00
(52) U.S. Cl. .............................. 380/270; 380/44; 380/45; 380/47; 705/64; 705/65; 705/71; 705/77; 705/78; 705/79; 713/172; 713/185
(58) Field of Search .................................. 380/44, 45, 23, 380/24, 28, 29; 705/13, 16, 21, 24

(56) References Cited

U.S. PATENT DOCUMENTS

| 3,536,109 | 10/1970 | Ginsburg et al. ...................... 141/98 |
| 3,642,036 | 2/1972 | Ginsburg et al. ...................... 141/94 |
| 3,650,303 | 3/1972 | Chambers et al. ..................... 141/1 |
| 3,662,924 | 5/1972 | Crandall et al. ...................... 222/64 |
| 3,786,421 | 1/1974 | Wostl et al. ......................... 340/149 |
| 3,814,148 | 6/1974 | Wostl et al. ......................... 141/98 |
| 4,263,945 | 4/1981 | Van Ness ............................ 141/98 |
| 4,313,168 | 1/1982 | Stephens et al. ..................... 364/465 |
| 4,345,146 | 8/1982 | Story et al. ......................... 235/381 |
| 4,386,266 | 5/1983 | Chesarek ............................. 235/380 |
| 4,469,149 | 9/1984 | Walkey et al. ....................... 141/94 |
| 4,490,798 | 12/1984 | Franks et al. ........................ 364/550 |

(List continued on next page.)

FOREIGN PATENT DOCUMENTS

| 0 134 109 | 3/1985 | (EP) . |
| 0 758 777 A1 | 2/1997 | (EP) . |
| 102768/2 | 8/1992 | (IL) . |
| 6227597 | 8/1994 | (JP) . |
| WO 94/05592 | 3/1994 | (WO) . |
| WO 94/06031 | 3/1994 | (WO) . |
| WO 95/14612 | 6/1995 | (WO) . |
| WO 95/32919 | 12/1995 | (WO) . |
| WO 96/28791 | 9/1996 | (WO) . |
| WO 96/36947 | 11/1996 | (WO) . |
| WO 97/24689 | 7/1997 | (WO) . |
| 94/4327 | 6/1994 | (ZA) . |

OTHER PUBLICATIONS

PCT International Search Report.
Sae Meeting Notice; Orvr Interaction with Balance Phase II Vapor Recovery Systems, May 19, 1997.
Sae Orvr Task Force Agenda; Open Discussion Topics for Sae Orvr Task Force, May 29, 1997.

*Primary Examiner*—Tod R. Swann
*Assistant Examiner*—Paul E. Callahan
(74) *Attorney, Agent, or Firm*—Coats & Bennett, PLLC

(57) ABSTRACT

The invention relates to providing secure transactions with a tag and POS device associated with a host network authorization system. In doing so, the tag is adapted to bi-directionally communicate with a POS device, preferably a fuel dispenser, which further communicates with a host network to provide authorization of the tag and carry out any desired purchases or transactions. To avoid transmitting data from which valuable account or financial information could be derived, between the tag and POS device or the POS device and the host network system, the invention may maintain all or a majority of account and financial information requiring absolute security only at the host network. Neither the tag nor the POS device has or has access to certain critical financial or account information. The tag also is adapted to communicate with other local sources and the POS device directly. Additional and alternate security is available for these communications. Furthermore, the local sources may need a password to access certain data stored in the tag's memory.

19 Claims, 25 Drawing Sheets

U.S. PATENT DOCUMENTS

| | | | |
|---|---|---|---|
| 4,532,511 | 7/1985 | Lemelson | 450/933 |
| 4,578,530 | 3/1986 | Zeidler | 178/22.09 |
| 4,600,829 | 7/1986 | Walton | 235/439 |
| 4,714,925 | 12/1987 | Bartlett | 340/825.55 |
| 4,728,955 | 3/1988 | Hane | 342/140 |
| 4,760,533 | 7/1988 | Bydlon | 364/465 |
| 4,846,233 | 7/1989 | Fockens | 141/94 |
| 4,881,581 | 11/1989 | Hollerback | 141/113 |
| 4,887,296 * | 12/1989 | Horne | 380/21 |
| 4,887,578 | 12/1989 | Woodcock et al. | 123/519 |
| 4,897,642 | 1/1990 | DiLullo et al. | 340/825.06 |
| 4,934,419 | 6/1990 | Lamont et al. | 141/94 |
| 4,935,961 * | 6/1990 | Gargiulo et al. | 380/21 |
| 4,967,366 | 10/1990 | Kaehler | 364/479 |
| 5,025,253 | 6/1991 | DiLullo et al. | 450/825.06 |
| 5,058,044 | 10/1991 | Stewart et al. | 364/551.01 |
| 5,070,328 | 12/1991 | Fockens | 340/825.54 |
| 5,072,380 | 12/1991 | Randelman et al. | 364/406 |
| 5,086,389 | 2/1992 | Hassett et al. | 365/401 |
| 5,131,441 | 7/1992 | Simpson et al. | 141/209 |
| 5,156,198 | 10/1992 | Hall | 141/94 |
| 5,184,309 | 2/1993 | Simpson et al. | 364/510 |
| 5,202,922 | 4/1993 | Iijima | 380/45 |
| 5,204,512 | 4/1993 | Ieki et al. | 235/382 |
| 5,204,819 | 4/1993 | Ryan | 364/465 |
| 5,217,051 | 6/1993 | Simpson | 141/59 |
| 5,238,034 | 8/1993 | Corfitsen | 141/94 |
| 5,249,612 | 10/1993 | Parks et al. | 141/219 |
| 5,267,592 | 12/1993 | Kaplan et al. | 141/387 |
| 5,327,066 | 7/1994 | Smith | 320/2 |
| 5,327,945 | 7/1994 | Simpson et al. | 141/59 |
| 5,343,906 | 9/1994 | Tibbals, III | 141/83 |
| 5,359,522 | 10/1994 | Ryan | 365/465 |
| 5,363,889 | 11/1994 | Simpson et al. | 141/208 |
| 5,365,984 | 11/1994 | Simpson et al. | 141/387 |
| 5,383,500 | 1/1995 | Dwars et al. | 141/98 |
| 5,392,049 | 2/1995 | Gunnarsson | 342/42 |
| 5,393,195 | 2/1995 | Corfitsen | 414/749 |
| 5,414,427 | 5/1995 | Gunnarsson | 342/51 |
| 5,425,103 * | 6/1995 | Shaw | 380/44 |
| 5,500,890 | 3/1996 | Rogge et al. | 379/91 |
| 5,521,363 | 5/1996 | Tannenbaum | 235/379 |
| 5,578,808 | 11/1996 | Taylor | 235/380 |
| 5,638,448 | 6/1997 | Nguyen | 380/29 |
| 5,642,401 | 6/1997 | Yahagi | 379/58 |
| 5,832,090 | 11/1998 | Raspotnik | 380/24 |
| 5,832,210 | 11/1998 | Akiyama et al. | 395/188.01 |

* cited by examiner

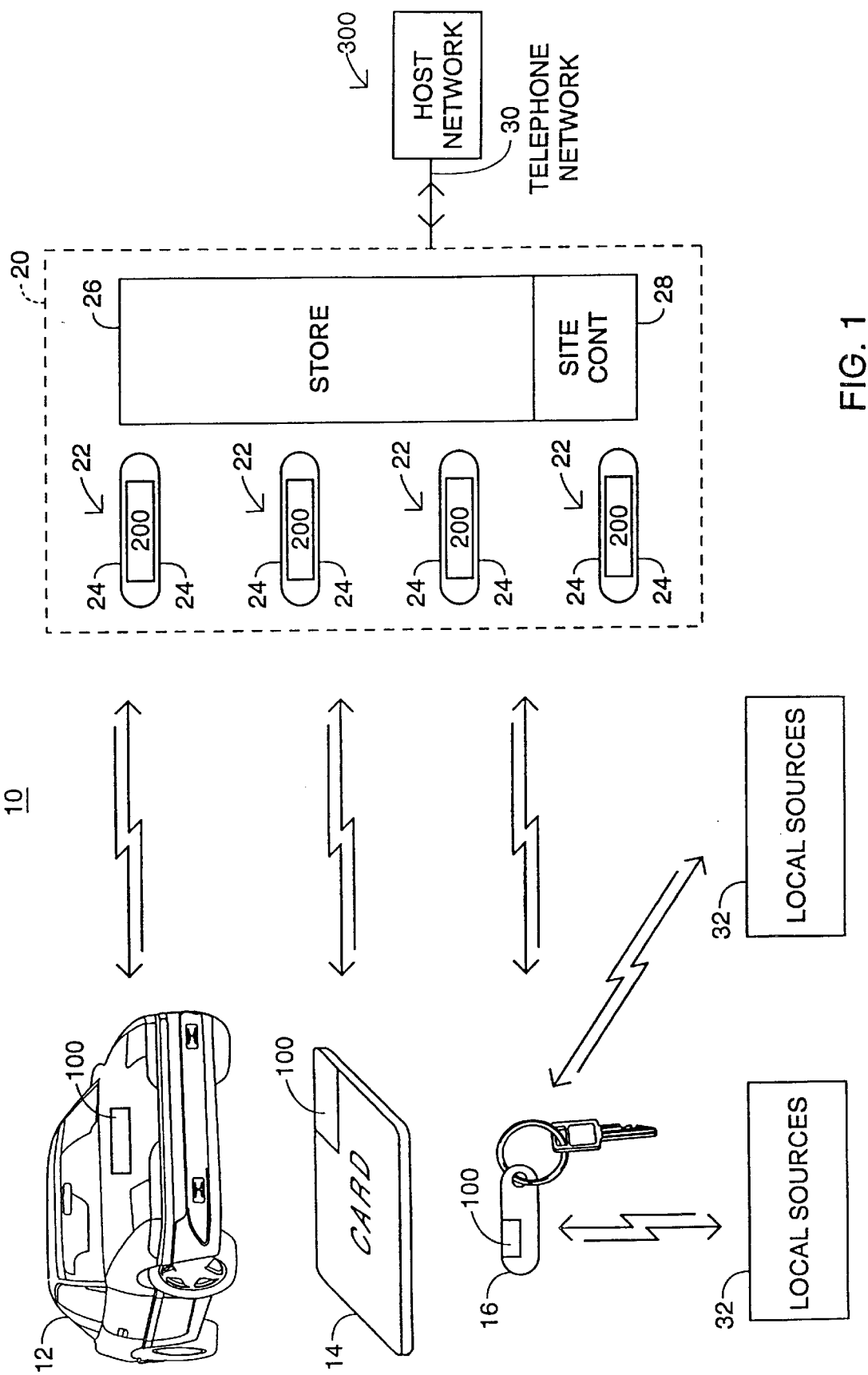

FIGURE 3B

|  | TAG ID VALUE - BYTES 5 AND 6 | |
|---|---|---|
| COMPANY NAME | ASCII | HEX |
| SHELL | SH | 53, 48 |
| LOCAL TEST | 00 | 30, 30 |
| NETWORK TEST | 01 | 30, 31 |

FIGURE 6

| GROUP MODE REGISTER PROGRAMMING ||
|---|---|
| COMMAND NAME | BIT POSITION |
| UNSECURE READ DATA | 7 (MSB) |
| UNSECURE SUBTRACT DATA | 6 |
| UNSECURE ADD DATA | 5 |
| UNSECURE WRITE DATA | 4 |
| SECURE READ DATA | 3 |
| SECURE SUBTRACT DATA | 2 |
| SECURE ADD DATA | 1 |
| SECURE WRITE DATA | 0 (LSB) |

FIGURE 7

| GROUP MODE REGISTER | | | | | | | |
|---|---|---|---|---|---|---|---|
| 0 | 0 | 0 | 0 | 1 | 1 | 1 | 1 |

FIGURE 8

| COMMAND NAME | COMMAND CODE (IN HEX) |
|---|---|
| SET DES PASSWORD | E1 |
| SET DES KEY | E2 |
| SET GROUP REGISTERS | E3 |
| ENCRYPT RANDOM NUMBER | E4 |
| SECURE WRITE DATA | E5 |
| SECURE ADD DATA | E6 |
| SECURE SUBTRACT DATA | E7 |
| SECURE READ DATA | E8 |
| UNSECURE WRITE DATA | E9 |
| UNSECURE ADD DATA | EA |
| UNSECURE SUBTRACT DATA | EB |
| UNSECURE READ DATA | EC |
| READ DES MODULE STATUS | ED |

FIGURE 10

| GROUP # | AVAILABLE FUNCTION ||||  GROUP FUNCTION |
|---|---|---|---|---|---|
|  | WRITE | READ | ADD | SUBTRACT |  |
| GROUP #0 | SECURE | SECURE | SECURE | SECURE | TBD |
| GROUP #1 | SECURE | UNSECURE | SECURE | SECURE | CASH OR PREPAID TAG |
| GROUP #2 | SECURE | UNSECURE | SECURE | UNSECURE | LOYALTY TAG |
| GROUP #3 | SECURE | UNSECURE | N/A | N/A | CUSTOMER INFO |

FIGURE 11

| ACCEPTED FUNCTIONS | DATA BYTES | GROUP # |
|---|---|---|
| SECURE READ, WRITE, ADD, & SUBTRACT | | BLOCK # 0<br>GROUP #0<br>BLOCK # 31 |
| SECURE ADD, SUBTRACT, & WRITE UNSECURE READ | | BLOCK # 0<br>GROUP #1<br>BLOCK # 31 |
| SECURE ADD & WRITE UNSECURE READ &, SUBTRACT | | BLOCK # 0<br>GROUP #2<br>BLOCK # 31 |
| SECURE WRITE UNSECURE READ | | BLOCK # 0<br>GROUP #3<br>BLOCK # 31 |

FIGURE 12

| PARTITION # | SIZE | PASSWORD | CONTENTS | LOCAL ACCESS | HOST ACCESS |
|---|---|---|---|---|---|
| 0 | 192 BYTES | SUPERUSER KNOWN ONLY BY THE HOST. DIFFERENT PASSWORD FOR EACH TAG, CALCULATED FROM THE TAG ID #. THE MSB OF THE PASSWORD IS FORCED TO ZERO. | CUSTOMER DEFINITION DATA FIELDS | READ ANY FIELDS WITHOUT A PASSWORD. WRITE ONLY ON SPECIFIC INSTRUCTIONS WITH THE PASSWORD PASSED FROM THE HOST. | AS NOTED AT LEFT. |
| 1 | 32 BYTES | ADMINISTRATOR PASSWORD. CALCULATED FROM THE TAG ID NUMBER. KNOWN BY THE CRIND AND HOST. THE MSB OF THE PASSWORD IS FORCED TO A LOGICAL ONE | LOCAL AND HOST AUTHENTICATION NUMBERS. CRIND CAN CALCULATE THE LOCAL AUTH #, ONLY THE HOST CAN CALCULATE THE HOST AUTH #. | CRIND CAN CALCULATE THE PASSWORD FOR THIS PARTITION FROM THE TAG ID. CAN THEN READ LOCAL AND HOST AUTHENTICATION CODES. | THE HOST AUTHENTICATION NUMBER IS PASSED TO THE HOST FOR AUTHENTICATION. |
| 2 | 32 BYTES | USER PASSWORD. SAME PASSWORD IN ALL TAGS, KNOWN TO THE CRINDS. THE MSB OF THE PASSWORD IS FORCED TO ZERO. | SCRATCHPAD READ/WRITE AREA. | COMPLETE READ/WRITE ACCESS LOCALLY WITH A KNOWN PASSWORD. | N/A |

FIGURE 13A

| FIELD NUMBER | FIELD SIZE (BYTES) | FIELD FORMAT | DESCRIPTION | INITIAL VALUES IN HEX |
|---|---|---|---|---|
| 1 | 1 | BINARY | NUMBER OF VALID BYTES IN PARTITION 0. | 14 |
| 2 | 1 | BINARY | TAG DATA FORMAT SPECIFIER | 00 |
| 3 | 1 | BINARY | 0 - NETWORK TRANSPONDER<br>1 - LOCAL USE TRANSPONDER | 00 |
| 4 | 1 | BINARY | NUMBER TO DESIGNATE THE TYPE OF TRANSPONDER<br>    00 - NOT USED<br>    01 - PASSIVE KEY CHAIN<br>    02 - PASSIVE CARD<br>    03 - PASSIVE CAR MOUNT<br>    04-128 - PASSIVE OTHER<br>    128 - ACTIVE KEY CHAIN<br>    129 - ACTIVE CARD<br>    130 - ACTIVE CAR MOUNT<br>    131- ACTIVE KEY CHAIN WITH DES<br>    132 - ACTIVE CARD WITH DES<br>    133 - ACTIVE CAR MOUNT WITH DES<br>    134 - 255 - ACTIVE OTHER | 80 |
| 5-10 | 6 | NUMERIC | ISSUE DATE MM/YYYY | 30 35 31 39 39 37 |
| 11 | 1 | BINARY | NUMBER TO INDICATE THE ACCEPTABLE FUEL GRADE.<br>    0 - NO RESTRICTION | 00 |
| 12 | 1 | BINARY | PURCHASE RESTRICTIONS<br>    0 - NO RESTRICTIONS<br>    1 - FUEL ONLY<br>    2 - FUEL AND OIL ONLY<br>    3 - DRIVER ID TAG, NO PURCHASE ALLOWED | 00 |

FIGURE 13B

| 13-16 | 4 | NUMERIC | FLEET CARD REQUIREMENTS ALLOWS UP TO FOUR PROMPTS TO BE SPECIFIED IN THIS FIELD.<br>    0000 - NOT A FLEET CARD<br>    1 - PROMPT FOR ENTER DRIVER NUMBER<br>    2 - PROMPT FOR ENTER VEHICLE NUMBER<br>    3 - PROMPT FOR ENTER JOB NUMBER<br>    4 - PROMPT FOR ENTER DATA<br>    5 - PROMPT FOR ENTER DEPARTMENT NUMBER<br>    6 - PROMPT FOR ENTER USER ID<br>    7 - RESERVED FOR FUTURE EXPANSION<br>    8 - PROMPT FOR ENTER ODOMETER<br>    9 - RESERVED FOR FUTURE EXPANSION<br>    A - REQUIRE A DRIVER ID TAG | 30 30 30 30 |
|---|---|---|---|---|
| 17 | 1 | BINARY | PRINT RECEIPT<br>    0 - NO RECEIPT (OR HOST DEFINED)<br>    1 - PRINT RECEIPT AFTER FUELING<br>    2 - 255 - TBD | 00 |
| 18 | 1 | BINARY | REQUIRE PIN NUMBER ENTRY<br>    0 - NO PIN NUMBER REQUIRED (OR HOST DEFINED).<br>    1 - PIN NUMBER ENTRY REQUIRED<br>    2 - 255 - TBD | 00 |
| 19 | 1 | BINARY | PAYMENT TYPE<br>    0 - NETWORK DEFINED<br>    1-255 - OTHER TBD | 00 |
| 20 | 1 | BINARY | DISPENSER AUTHORIZATION<br>    0 - WAIT FOR NETWORK<br>    1 - AS SOON AS CRIND ALLOWS<br>    2 - 255 - TBD | 00 |
| 21-192 | 172 | UNKNOWN | UNDESIGNATED BINARY FIELDS, CODED AS REQUIRED. | ALL 00 |

FIGURE 14

| FIELD NUMBER | FIELD SIZE (BYTES) | FIELD FORMAT | DESCRIPTION | INITIAL VALUES IN HEX |
|---|---|---|---|---|
| 193-200 | 8 | BINARY | LOCAL AUTHENTICATION CODE | CALCULATED AT HOST |
| 201-208 | 8 | BINARY | HOST AUTHENTICATION CODE | CALCULATED AT HOST |
| 209-216 | 8 | BINARY | UNUSED | ALL 00 |
| 217-224 | 8 | BINARY | UNUSED | ALL 00 |

FIGURE 15

| FIELD NUMBER | FIELD SIZE (BYTES) | FIELD FORMAT | DESCRIPTION | INITIAL VALUES IN HEX |
|---|---|---|---|---|
| 225-256 | 32 | BINARY | LOCAL SCRATCH PAD AREA. | ALL 00 |

CRYPTOGRAPHY SECURITY FOR REMOTE DISPENSER TRANSACTIONS

This is a divisional application claiming the benefit of application Ser. No. 08/895,417 filed Jul. 16, 1997 entitled CRYPTOGRAPHY SECURITY FOR REMOTE DISPENSER which is incorporated herein by reference.

BACKGROUND OF THE INVENTION

The present invention relates generally to providing secure transactions between a local transaction device and a remote communication device and, more particularly, to a transponder fuel dispensing system for providing secure authorizations and transactions using the transponder in a fuel delivery, retail sales and service environment.

In recent years, traditional gasoline pumps at service stations have evolved into elaborate point-of-sale (POS) devices having sophisticated control electronics and user interfaces with large displays and touch pads (or screens). These dispensers include various types of payment means, such as card readers, to expedite and further enhance fueling transactions. A customer is not limited to the purchase of fuel at the dispenser. More recent dispensers allow the customer to purchase services, such as car washes, and goods such as fast food or convenience store products at the dispenser. Once purchased, the customer need only pick up the goods and services at the station store.

Given the ever increasing demand to increase transaction efficiency by both fuel suppliers and customers, transaction systems associated with the service stations are further evolving to provide fully automated authorization and purchasing. It would be advantageous if customers no longer needed to use a credit/debit card or smartcard to purchase fuel or other products or services. This can be accomplished if the customer, vehicle or both are equipped with a remote intelligent communications device, or transponder (hereinafter referred to as a tag for simplicity), capable of remotely communicating with fuel dispensers and other devices as desired. These tags and dispensers operate in conjunction to provide a cashless and cardless transaction system where transactions are automatically charged or debited without requiring any action by the customer.

Numerous patents have issued and foreign applications published relating to technology associated with communicating information between a tag or like transponder and the fuel dispenser. These patents disclose communicating between the tag and fuel dispenser with fiber optics, electromagnetic radiation, such as radio frequency transmissions, infrared, direct electrical connections and various others means or combination of these means. Various types of information is communicated between the tag and the dispenser including vehicle identification, customer identification, account information, fuel requirements, diagnostics, advertising, and various other types of solicited and unsolicited messages. Certain specific applications equip the tag and dispenser with cryptography electronics to encrypt and decrypt data transferred between the tag and dispenser.

Tag transponder technology is used in many areas of technology relating to vehicles. Such technology is used in tracking vehicles, navigational aids, toll collection, diagnostics, vehicle security and theft deterrence, keyless entry, refueling, collision avoidance, vehicle identification, surveillance and traffic control as well as transmitting and receiving financial data.

Using tag technology in association with the fuel dispensing environment is currently in its embryonic stage. Although further advances occur at a continually increasing rate, a concern of utmost importance has not been addressed. Given the ingenuity and resourcefulness of information thieves, financial and account information is susceptible to theft if transmitted from the tag to the dispenser and onto a host network system, which generally provides authorization and account adjustment functions for the transaction. Even with today's most sophisticated coding and encryption techniques, information thieves, given enough time and opportunity, are able to decrypt the encrypted data and obtain various financial and account information.

Further dangers arise when each fuel dispenser either includes, or relays this account information to the host network. Theft and fraud opportunities arise from not only the information thieves stealing information from the airwaves in the local transaction environment, but from those having access to confidential information stored in the tag, dispenser and fuel station store. A stolen tag provides a thief an indefinite amount of time to figure out the internal workings and information within the tag.

Additionally, since most of these tags will necessarily and ultimately communicate with a central network host through the fuel dispenser POS, access to various different accounts and different financial information is available for purchasing any number of products using a number of accounts. In addition to providing high levels of security for tag authorization, account access, and data transfer, less sophisticated security techniques providing lower levels of security are needed to facilitate certain tag functions that either do not require a high degree of security or require the tag to access and communicate with a fuel dispenser or other source, such as a restaurant or other goods or services provider that does not have high level security capability. For example, service stations or restaurants may want to access various types of non-confidential information on the tag to determine identification or other information relating to their particular business. Based on this information, the businesses may want to provide loyalty points for a tag holder relating to the number of visits or amount of goods or services purchased. Although providing loyalty points does not require the intense security necessary to secure financial account information, these local businesses still need to ensure to a sufficient degree that unscrupulous customers cannot adjust their loyalty points at will.

Another reason for providing different levels or types of security for different transactions is to reduce the number of times information thieves have access to a given security technique. Security is enhanced if the manner of encryption or the key used for encryption varies periodically and if the key used for encryption and decryption is never transmitted. Thus, there is a need for a secure transaction system capable of providing virtually impenetrable transactions between a tag and a fuel dispenser associated with a host authorization network. There is also a need for this system and tag to enable other sources to access the tag at lower levels of security without jeopardizing account or financial information in addition to providing general access to non-confidential information. The system should avoid transmitting cryptography keys and should periodically change keys during transactions to minimize any chance a thief may have in deciphering the key.

SUMMARY OF THE INVENTION

Applicants fulfill this need by providing secure transactions with a tag and POS device associated with a host network authorization system. In doing so, the tag is adapted to bi-directionally communicate with a POS device, preferably a fuel dispenser, which further communicates with a host network to provide authorization of the tag and carry out any desired purchases or transactions. To avoid transmitting data from which valuable account or financial information could be derived between the tag and POS device or the POS device and the host network system, the invention may maintain all or a majority of account and financial information requiring absolute security only at the host network. In tie preferred embodiment, neither the tag nor the POS device has or has access to critical financial or account information. But, the security system will also provide high levels of security for applications requiring transmission of such information.

In order to avoid placing this information at risk during transactions, the invention provides a unique identifier for each transponder wherein the host network maintains account and financial information associated with the tag having the unique identifier. The tag identifier is transmitted to the host system through the POS device, and the host network checks to see that the tag, and not a counterfeit, has sent the identifier. Once the host system determines that an authorized tag sent the identifier, the host authorizes the POS device to further interact with the tag and allow all or certain subsequent transactions.

Preferably, the tag is authenticated using identical cryptography techniques known only by the tag and host, but not by the POS device. Initially, the communication electronics of POS device, acting as an interrogator, will continuously scan for a tag within the field. Once a tag comes within the field in response to the interrogator, the interrogator will recover the tag's identifier, hereinafter referred to as the ID number, from the tag. The POS device will generate authentication check data, preferably a random number, and send it to the tag for encryption. The tag then encrypts the random number with an encryption technique using a main cryptography key and transmits the encrypted random number back to the POS device. The interrogator passes the ID number, the encrypted random number and the original random number to the host through the associated POS device. The host determines or calculates the main cryptography key used in the tag from the tag ID number. The host encrypts the random number sent from the POS device and compares it with the encrypted random number sent from the tag through the POS device. The host then compares the encrypted random numbers encrypted by the host and the tag. If these numbers match, the host signals the POS device that the tag is valid.

To further enhance security, the main cryptography key stored in the tag and determined or calculated by the host is only used for authentication of the tag. Data transfers or transactions between the tag and host through the POS device requiring security are encrypted and decrypted as necessary by the tag and host using a session key, which is diff rent then the main cryptography key. Preferably, a new session key is generated for each transaction and is a function of a random number, independently generated in the tag and host, as well as the main encryption key. The tag random number is preferably generated upon receipt of the random number generated at the POS device. The tag random number is transmitted to the host through the POS device so that both the tag and host can independently generate the session key capable of encrypting and decrypting data at either the host or the tag. The method used to generate the session key from the tag random number must be the same in both the host and tag. Similarly, the electronics in the tag and host are used to encrypt the random number generated at the POS device.

Each tag includes memory for storing various types of data, including information and commands. Preferably the memory and associated electronics allow data to be stored in the memory, read from the memory and transmitted to the POS device and altered according to commands sent from remote sources, including, but not limited to the POS device.

For example, the tag may include portions of memory which are accessible and modifiable by numerous fuel dispensers, restaurant interrogators and the like. Various portions of memory may have different security levels with corresponding passwords. Preferably, the memory is partitioned into four or more groups wherein the associated electronics may store data in the group, read data from the group, add to the data in the group and subtract from the data in the group. Depending on the group, the available functions are controlled by the group and its security level. For example, a first group (group I) may require all functions to be secure; thereby, requiring that only the host, acting through the POS device, has access to the group I partition and that only the host can carry out the store, read, add or subtract functions. A second group (group II) may require the store, add and subtract functions be authorized by the host and allow sources other than the host to read the data stored in group II. This is useful with tags used as smartcards having a cash reserve or prepaid tags having a set amount of credit. Group II may be arranged so that sources other then the host can check availability of funds, but cannot modify those funds without authorization. A third group (group III) may be configured so that the store and add functions are secure while the read and subtract functions are accessible by other sources at a lower security level. This lower security may be provided the cryptography and/or passwords. Group III data arrangements are useful where sources other than the host recognize customer loyalty and are allowed to provide the customer benefits based on a number of loyalty points accumulated on the tag. The source may subtract a loyalty point for a benefit provided, as well as ensure the benefit should be provided by checking the loyalty points stored on the tag. However, it is undesirable to allow the local source to add loyalty points without authorization. A fourth group (group IV) may be arranged such that customer information is accessible by sources other than the host, but cannot be changed without authorization from the host Group IV is useful in situations where local sources need to determine information, such as identification, about the tag and tag holder.

These and other aspects of the present invention will become apparent to those skilled in the art after reading the following description of the preferred embodiments in conjunction with the drawings.

BRIEF DESCRIPTION OF THE DRAWINGS

FIG. 1 is a schematic of a tag constructed and implemented according to a preferred embodiment of the present invention interacting with a POS device and host network.

FIG. 3B shows sample tag ID values for bytes 5 and 6 for the tag ID format shown in FIG. 3A.

FIG. 6 shows a preferred format for programming a group mode register.

FIG. 7 a sample group mode register setting.

FIG. 8 is a list of certain tag commands and a preferred command code.

FIG. 10 is table showing select memory group configurations adapted to provide select group functions.

FIG. 11 shows the memory block arrangement for the group configuration outlined in FIG. 10.

FIG. 12 outlines a tag's user memory organization and defines passwords associated therewith.

FIG. 13A and 13B outline customer information data fields for partition number 0 as defined in FIG. 12.

FIG. 14 outlines the local and host authentication codes for partition number 1 as defined in FIG. 12.

FIG. 15 outlines the scratch pad area for partition number 2 as defined in FIG. 12.

DESCRIPTION OF THE PREFERRED EMBODIMENTS

Figure 2A:
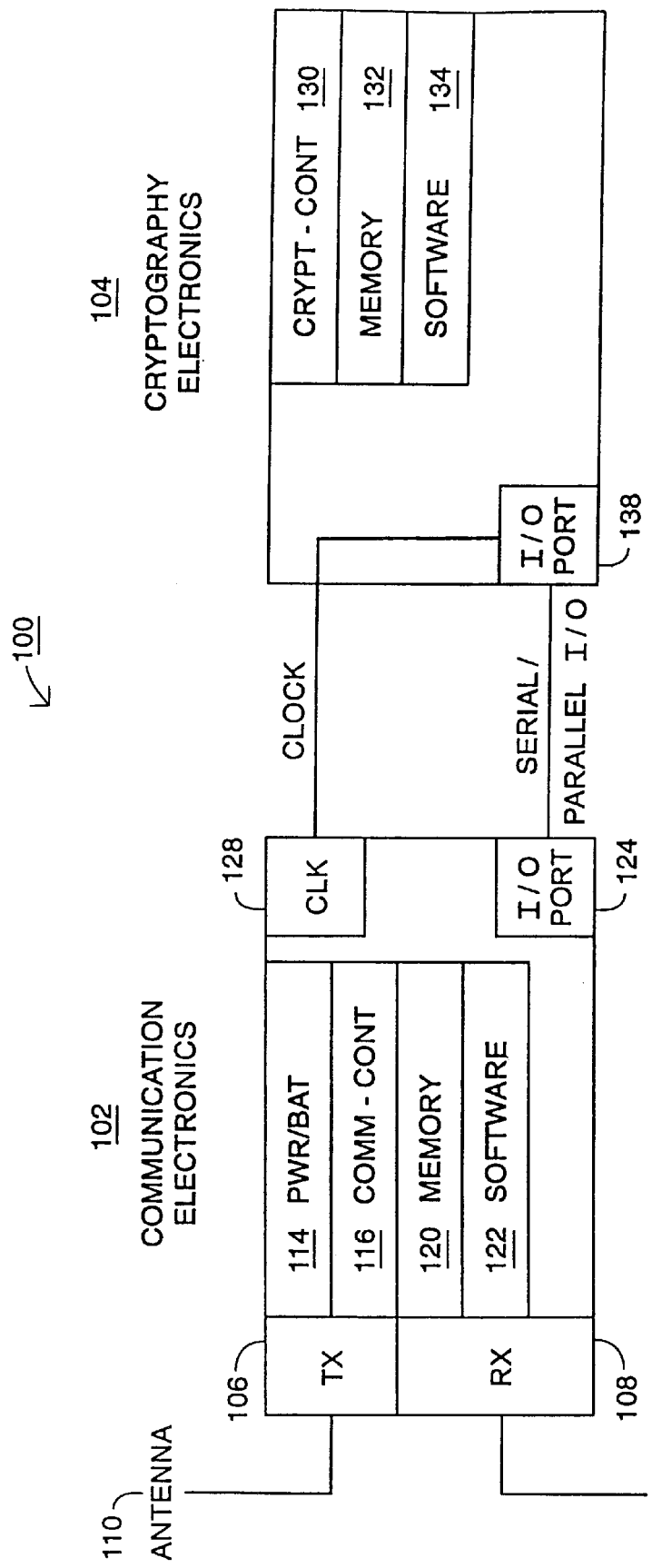
FIG. 2A is a schematic representation of the tag 100 constructed according to the preferred embodiment

In the following description, like reference characters designate like or corresponding parts throughout the several figures. Referring now to the drawings in general, and FIG. 1 in particular, please understand that the illustrations are for the purpose of describing preferred embodiments of the invention and are not intended to limit the invention thereto. As best seen in FIG. 1, a secure transaction system generally designated 10, is shown constructed according to a preferred embodiment of the present invention. The secure transaction system 10 includes or is associated with three major subsystems: a remote communication unit 100 (hereinafter a tag); a POS device 200 and a host network 300. In general, remote communication units 100 are adapted to communicate with and through the POS device 200 in order to obtain authorization and communicate information to and from the host network 300. The tag 100 may also communicate with the POS device 200 or other local sources 32 directly.

Various means of security are employed depending on the information being communicated and the source and destination of the information. Importantly, the tag 100 and host network 300 are adapted to encrypt and decrypt certain communications there-between, while the POS device 200 primarily only relays the encrypted information sent between the tag 100 and host network 300. Preferably to enhance security, the POS device 200 is unable to decrypt such information.

The tag unit 100 is preferably integrated into a small carrying medium, such as a module in a vehicle 12, a transaction card 14 or a key fob 16. Regardless of the medium carrying the tag 100, the unit is designed to provide remote bi-directional communications with the POS device 200. Preferably, the POS device 200 is placed in a fuel dispensing environment 20, and in particular, at each fueling position 24 of the fuel dispenser 22. The dispensers are operatively associated with a central station store 26 by a conventional wire system, which may house a convenience store as well as one or more restaurants. Many fuel dispensing environments 20 will provide services, such as car washes, in addition to goods. Generally the store 26 will include a central site controller 28 to provide central control functions for each dispenser 22. Each dispenser, and its respective POS electronics, generally communicates either directly, or indirectly through the central site controller 28, to the host network 300 via a telephone network 30. The host network 300 provides authorizations and other data for the various transactions attempted at each POS device 200.

In addition to communicating with the POS devices 200, the transponders 100 are also adapted to communicate with various other local sources 32 for various informational and transaction-type functions. These local sources 32 may include any number of goods or service providers, such as local restaurants.

The present invention provides virtually impenetrable security with respect to informational and financial communications between the transponder 100 and the host network 300 through the POS device 200. High levels of security are also provided as desired for communications solely directed to the POS device 200 and the local sources 32 from the tag 100. Such direct communications from the tag 100 to the POS device 200 are those communications not intended to require interaction with the host network 300.

Turning now to FIG. 2A, the preferred embodiment of the tag 100 is shown. Communications electronics 102, adapted to provide remote communications with various remote sources, includes a transmitter 106 and receiver 108 having associated antennas 110, 112. The transmitter 106 and receiver 108 operate to transmit and receive data to and from the remote communications unit 100. The communications electronics 102 also include a battery power supply 114, a communication controller 116 associated with a memory 120 having the software 122 necessary to operate the communications electronics 102 and communicate with the cryptography electronics 104. Serial communications between the communication electronics and the cryptography electronics 102, 104 is provided via the input/output (I/O) ports 124, 138 associated with the respective electronics. The communication electronics 102 provide a clock 128 signal to the I/O port 138 of the cryptography electronics 104. The cryptography electronics 104 include a controller 130, memory 132 and software 134 necessary to encrypt and decrypt data, as well as provide any additional operations. The memory 120, 132 may include random access memory, read only memory or a combination of both. Notably, the communication controller 116 and the cryptography controller 130 may be integrated into one controller. Similarly the software and memory of the communication and cryptography modules could be merged.

Figure 2B:
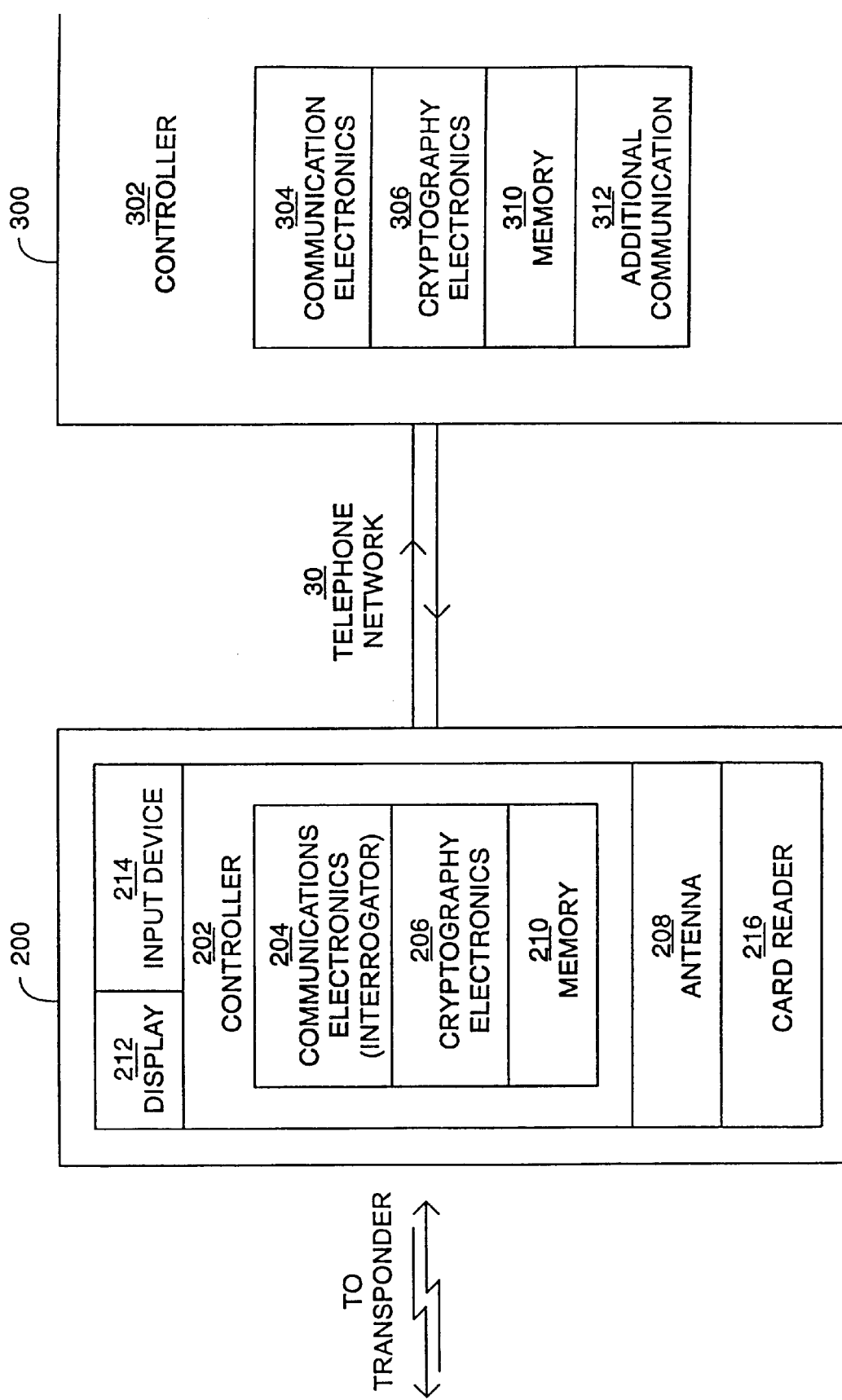
FIG. 2B is a schematic of a POS device and host network constructed according to the preferred embodiment.
Figure 2C:
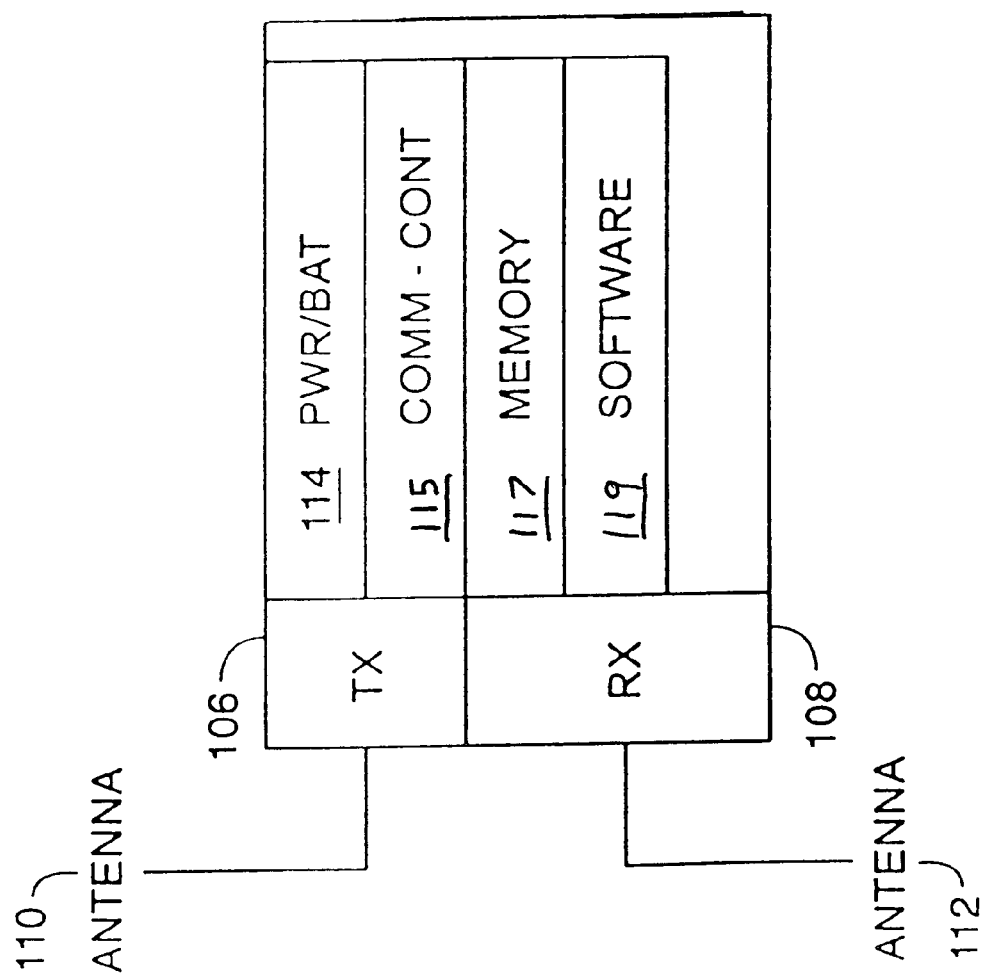
FIG. 2C is a schematic representation of the tag 100 having integrated electronics constructed according to the preferred embodiment.

As shown in FIG. 2C, the communication and cryptography electronics, as well as any associated controllers may be integrated into a single controller system and/or integrated circuit. In such cases, a single controller 115 is associated with memory 117 having software 119 as necessary for operation. In such an integrated system, the controller 115 will carryout any cryptography functions as well as any other necessary functions.

The communication electronics 102 are preferably the Micron MicroStarnp™ produced by Micron Communications, Inc., 8000 South Federal Way, Boise, Id. 83707-0006. A detailed description of the MicroStamp engine™ is provided in the Preliminary Data Sheet and the MicroStamp Standard Programmers Reference Manual provided by Micron Communications, Inc. These references and the information provided by Micron Communications on their website at HTTP://WWW.MCC.MICRON.COM are incorporated herein by reference. The Micron MicroStamp engine™ is an integrated system implementing a communications platform referred to as the MicroStamp™ standard on a single CMOS chip.

The communications controller 116 specifically provides a spread spectrum processor associated with an eight-bit microcontroller. The memory 120 includes 256 bytes of RAM. The receiver 108 operates in conjunction with the spread spectrum processor and is capable of receiving direct sequence spread spectrum signals having a center frequency of 2.44175 GHz. The transmitter 106 is preferably a DPSK modulated back-scatter transmitter traitting differential phase shift key (DPSK) modulated back-scatter at 2.44175 GHz with a 596 KHz sub-carrier.

In order to save power and extend battery life, the communication electronics 102 operate at a low-current, sleep mode until an internal programmable timer causes it to wake up. The communication electronics 102 determine whether there is a properly modulated signal present and, if not, immediately returns to the sleep mode. The modulated signal of which the communication electronics 102 look for once it awakens is provided by the POS device 200 or one of the local sources 32. If a properly modulated signal is present, the communication electronics 102 process the received command and send an appropriate reply. The communication electronics 102 then return to the sleep mode. The communications electronics 102 cause the cryptography electronics 104 to awaken as necessary to encrypt or decrypt data received by or transmitted from the tag 100.

Referring now to FIG. 2B, a schematic representation of the POS device 200 and host network 300 is shown. The POS device 200 preferably includes a controller 202 forming communication electronics 204 and cryptography electronics 206. The controller 202 is associated with a memory 210 and an antenna 208 for providing remote communications. The controller 202 interfaces with the telephone network 30 to provide bi-directional communications with the host network 300. Those skilled in the art will appreciate that any suitable form of communications between the POS device 200 and host network 300 are considered within the scope of this disclosure and the claims that follow. The POS device 200 preferably includes a display 212 and an input device 214, such as a touch pad or touch screen associated with the display 212. In the preferred embodiment, the POS device 200 is a fuel dispenser having at least two fueling positions and a card reader 216 for receiving payment through any variety of credit, debit or smartcards. The POS device 200 may also include a cash acceptor for receiving payment. The card and cash acceptors are present to service those customers who do not have tags 100. Customers having tags 100 have a lessened need for these devices in the POS device 200. A suitable POS is The Advantage fuel dispenser sold by Gilbarco, Inc., upgraded with the Micron MicroStamp Interrogator from Micron Electronics or having compatible integrated communication electronics.

The host network 300 also includes a control system 302 forming communication electronics 304 and cryptography electronics 306. The host network 300 also includes memory 310 associated with the electronics 304, 306. The host network 300 may include additional communications ports 312 for communicating with other POS devices.

TAG OVERVIEW

Preferably, the tag cryptography electronics 104 implement the encryption standard called DES (or Data Encryption Standard) as defined by Federal Information Processing Standard Publication Number 46. Various commands are available in the tag cryptography electronics 104 using the DES algorithm as a basis for security. Although other cryptography methods are available and will work with the current invention, applicant believes DES provides the highest degree of security when used according to the invention described herein.

The tag cryptography electronics 104 are used for two main functions in the tag 100. First, it provides a secure authentication procedure when implemented with the network host 300. Thus, if the tag 100 passes this authentication procedure, then to a high level of confidence, the host 300 is assured that a real tag 100 was authenticated. Second, the tag cryptography electronics 104 allow the host 300 to securely write data to the tag 100, read data from the tag 100 or modify data in the tag 100.

Attention is directed again to FIG. 2A. Preferably, when DES authentication and write functions are included in the tag, all of the DES functionality, including storage of DES keys, resides in the tag cryptography electronics 104 and not in the tag communication electronics 102. In other words, the tag communication electronics 102 act as the transmission medium for the tag cryptography electronics 104. Communications from the communication controller 116 to the tag cryptography electronics 104 takes place via the tag communication electronics 102 using the WriteDigitalPort and ReadDigitalPort commands, which are standard MicroStamp commands.

All data, including commands sent to the tag cryptography electronics 104, are sent as data within the WriteDigitalPort command. The data to be sent to the tag cryptography electronics 104 is stored in a buffer in the tag communication electronics 102 until it is serially transmitted to the tag cryptography electronics 104. The data packet sent to the tag cryptography electronics 104 using the WriteDigitalPort command is only limited by the size of the buffer in the tag communication electronics 102 and is preferably 64 bytes.

Likewise, when the tag cryptography electronics 104 have data for the tag communication electronics 102, data is transmitted to the tag communication electronics 102 where it is stored in a buffer in the tag communication electronics 102. The size of the data packet from tag cryptography electronics 104 are limited in the same manner set forth above with regard to the data packet sent to the tag cryptography electronics 104. This data is read from the MicroStamp module using the ReadDigitalPort command.

HOST TAG GENERATION

When initially configuring tag 100, the host network 300 generates a tag identification number (ID) and a main tag key, which is preferably a DES key, and directly injects these numbers into the tag 100 along with any other pertinent information. Generally, the POS device 200 is not used during configuration. Preferably, a different main tag key is injected into every tag 100, and a secure algorithm is used to generate the main tag keys from a master key known only by the host 300. Maximum security is obtained when it is impossible for an infiltrator or cracker to calculate the host master key from the main tag key and tag ID.

Figure 3A:
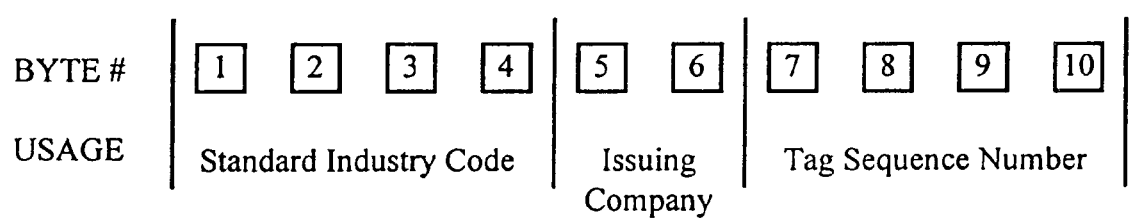
FIG. 3A shows a preferred format for a tag ID.

The preferred format for a 10 byte tag ID is shown in FIGS. 3A and 3B. The first four bytes, bytes 1–4, are reserved for market segment definitions. Preferably, each market segment includes a classification as defined by the *Standard Industrial Classification Manual*. For example, the classification (generally known as the SIC code) for the service station industry is "5541". This classification is preferably stored as four byte ASCII value (hex 35 35 34 31). In this example, the code would appear in the first four bytes of all tags of companies in the service station industry. Bytes 5 and 6 identify the issuing company and the last four bytes are represent the specific tag's generation number used to uniquely identify the particular tag for that company. With bytes 7–10 available to define a tag number for a particular company, over four billion tags may issue without repetition for each issuing company. Special codes may be stored in any of the tag ID fields, such as the issuing company field, to provide for local or network testing. If the tag ID is formatted as depicted and the fifth and sixth data fields are coded 00 (hex 30 30), then the tag is a local test tag, and therefore, the tag ID is not passed on to the host 300. If the fifth and sixth data fields are coded 01 (hex 30 31), then the tag is a network test tag and the tag ID is passed on to the host 300. Such testing is typically used to test communication ability and assure proper operation of the POS device 200 and/or host 300.

PREFERRED DES KEY GENERATION PROCEDURE

Figure 4A:
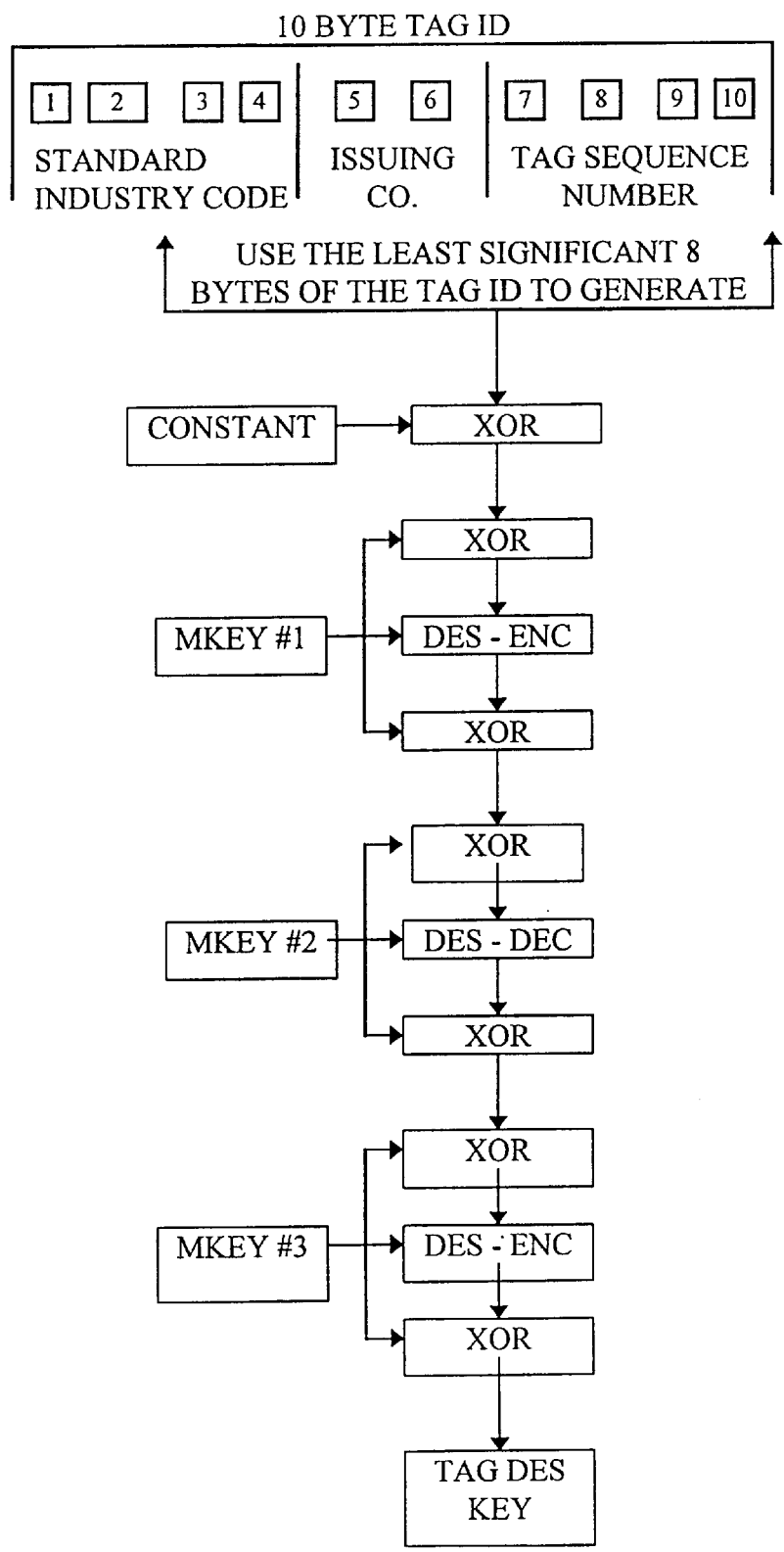
FIG. 4A depicts a preferred process for generating a tag's main DES key.

The preferred procedure for generating each main tag key for the various tags 100 employs triple encryption with three secret master keys. The main tag keys are generated by the host 300. Referring now to FIG. 4A, the last 8 bytes of the tag ID number are preferably used to generate the main tag key. For example, if Shell Oil Company is the issuing company, the 8 byte number (rendered here in hexadecimal) would be of the form 34 31 53 48 xx xx xx xx, where the x's represent the individual tag's sequence number. Initially, an exclusive-OR (XOR) is taken of the 8 byte number derived from the tag ID and a constant, chosen randomly, whose value is securely held by the host network 300. The result is XORed with the first master key (Mkey #1), encrypted with the first master key, and XORed with the first master key. This result is XORed with the second master key (Mkey #2), decrypted with the second master key, and XORed with the second master key. This result is XORed with the third master key (Mkey #3), encrypted with the third master key, and XORed with the third master key. The final result is the main tag key, which is loaded into the tag 100.

All four components of the key generation procedure, the constant, first master key (Mkey #1), second master key (Mkey #2), and third master key (Mkey #3) are held in strict confidence at the host 300. These components are not cryptographically or mathematically related to each other. Furthermore, the host 300 should ensure that none of these components are cryptographically decipherable by unauthorized persons. Although this is the preferred embodiment, various combinations of logic functions and cryptography are possible to ensure a difficult to crack key generation process. As with any of the key and code generation techniques disclosed herein, portions of the tag ID may be operated on by a function to achieve a desired result The function may range from $f(x)=x$ to any convoluted function chosen for the generation process.

Figure 4B:
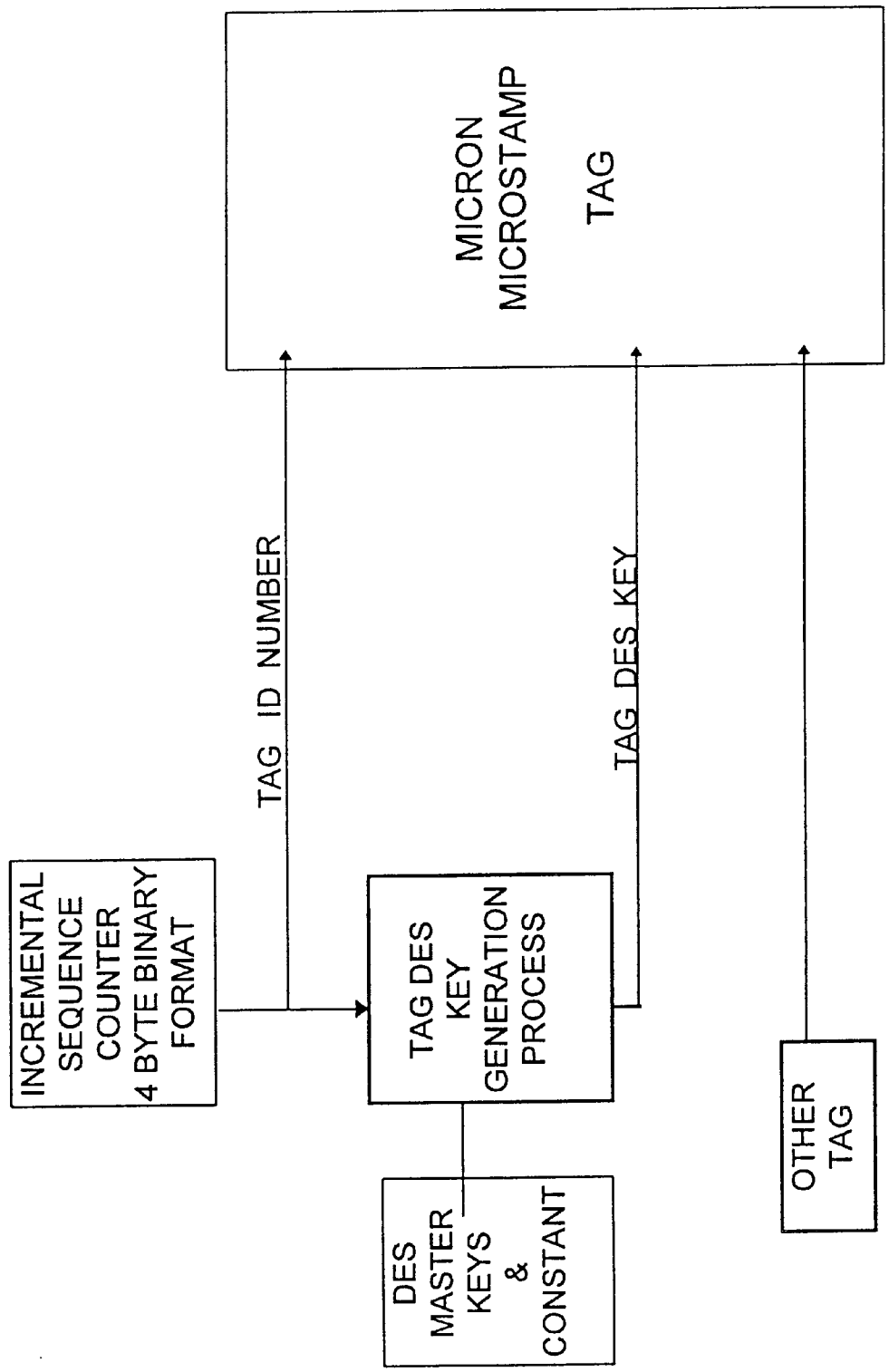
FIG. 4B depicts a preferred process for loading a tag with the tag ID and the main DES key generated in FIG. 4A.

The preferred process for loading the tag 100 with its respective tag ID and main DES key is shown in FIG. 4B. As discussed above, a 10 byte tag ID number comprising the standard industry code, company code and individual sequence number is directly loaded by the host 300 into the tag 100 during generation of the tag. Typically, a 4 byte sequence counter generates the tag sequence number forming bytes 7–10 of the tag ID. Concurrently with loading the tag ID number, the main DES tag key is generated using the master keys and loaded into the tag 100. Additionally, other information is loaded into the tag 100 during loading as desired. Once the tag is generated, it is distributed to customers for use with the POS device 200 and local sources 32.

HOST AUTHENTICATION OF TAG

Typically, tags 100 are authenticated at the host 300 using a DES encrypted value produced by the tag 100. The main tag key for this DES calculation is stored in the tag cryptography electronics 104 when the tag 100 is initialized. As noted, the tag 100 is initialized directly at host 300 without transmitting the main tag key to or through any other system.

Figure 5:
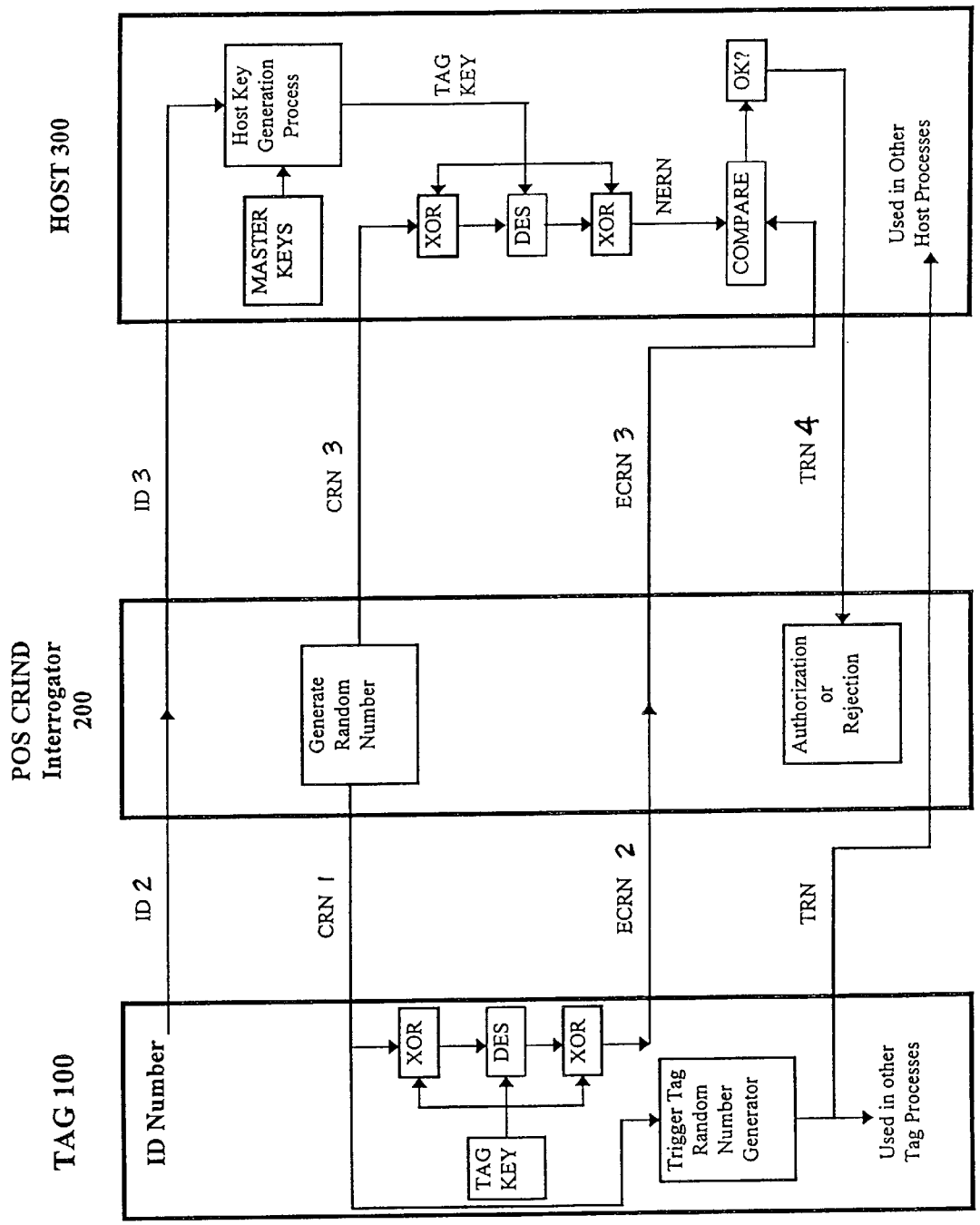
FIG. 5 depicts a preferred tag authentication process.

A preferred tag authorization process is shown figure 5. In step 1, the POS communication electronics 204 of the POS device 200 generate and send a random number (CRN) to the tag 100 and to the host 300. The tag 100 encrypts the random number and returns the encrypted random number (TRN) to the POS device 200 along with a tag identification number (ID) in step 2. The POS communication electronics relays the tag ID, the encrypted random number received from the tag 100 and the random number to the host 300 without modification in step 3. In the preferred embodiment, the tag ID number is 10 bytes, the random number is 8 bytes and the encrypted random number is 8 bytes. Upon receipt of the tag ID from the POS device 200, the host 300 calculates (or looks up) the main tag key for the tag 100 using the tag ID and the secret master keys in the same manner as the main tag key was initially created from the tag ID. In other words, the host 300 recalculates the main tag key for each operation. The host cryptography electronics 206 encrypt the random number using the recalculated main tag key and compares the result to the encrypted random number received from the tag 100. If they match, the tag 100 is a valid tag, and most likely not a counterfeit Upon authorization, the host 300 can use the ID number to look up transaction billing data or other information associated with the tag 100 or its owner and authorize the POS device 200 to carry the desired transactions in step 4.

In a fueling environment, the POS device 200 is, or is incorporated within, a fuel dispenser 24. Typically the card reader 216 in the dispenser (CRIND) will operate in conjunction with the POS communication electronics 204 to provide an interrogator. In order for the host 300 to authenticate a tag 100, the POS communication electronics 204 will continuously scan for a tag 100 within a particular communications field or range. The tag 100 will respond once inside the field by sending a command to POS device 200. This interrogation and response sequence is conventional in the Micron MicroStamp System.

Once the tag 100 responds, the POS device 200 will recover the tag ID from the tag 100. The POS device 200 generates the random number (CRN) and sends it to the tag 100 with an appropriate command. The tag 100 then encrypts the random number (CRN) using DES with the main tag key and transmits the encrypted random number (ECRN) back to the POS device 200. The POS device 200 subsequently transmits the tag ID, the random number (CRN), and the encrypted random number (ECRN) to the host 300.

The host 300 calculates the main tag key from the ID number in the same manner in which the host 300 originally generated the main tag key (see FIG. 4). The random number (CRN) originally generated by the POS device 200 is encrypted by the host 300 to provide a host network encrypted random number (NERN). The host 300 then compares the encrypted random number (ECRN) encrypted at the tag 100 to the host network encrypted random number NERN). If the ECRN and NERN match, then the host signals the POS device 200 or site controller 28 that the tag 100 is valid and authorized. Alternatively, the host 300 may decrypt the encrypted random number (ECRN) and compare the result to the random number (CRN).

DES MODULE REGISTERS

The tag cryptography electronics 104 and memory 132 of the tag 100 includes several designated registers for storing various types of values and information. Certain of these registers used in the preferred embodiment are listed and described as follows:

UNSIGNED CHAR DES Key Counter;
UNSIGNED CHAR Current Sequence Number;
UNSIGNED CHAR DES Password;
UNSIGNED CHAR DES Key;
UNSIGNED SHORT DES Module user Memory Size;
UNSIGNED CHAR DES Module Version Number;
UNSIGNED SHORT BEGIN BLOCK GROUP 0;
UNSIGNED SHORT END BLOCK GROUP 0;
UNSIGNED CHAR GROUP MODE 0;
UNSIGNED SHORT BEGIN BLOCK GROUP 1;
UNSIGNED SHORT END BLOCK GROUP 1;
UNSIGNED CHAR GROUP MODE 1;
UNSIGNED SHORT BEGIN BLOCK GROUP 2;
UNSIGNED SHORT END BLOCK GROUP 2;
UNSIGNED CHAR GROUP MODE 2;
UNSIGNED SHORT BEGIN BLOCK GROUP 3;
UNSIGNED SHORT END BLOCK GROUP 3; and
UNSIGNED CHAR GROUP MODE 3.

DES Key Counter The DES key counter is one byte in size and is incremented only when a new main tag key (a DES key) is written to the tag cryptography electronics 104. The DES key counter is initially zero when the tag cryptography electronics 104 is first powered up. This register allows an authorized tag programmer (i.e. host 300) to calculate a current DES password and main tag key and to change the main tag key if necessary. The DES password and its function is described in greater detail below.

Current Sequence Number

The current sequence number is used when transferring data between the tag 100 and a local interrogator of the POS device 200. The current sequence number allows the interrogator to ensure that an event has occurred in the presence of noise or other disturbing factors and prevents a command or operation from being accidentally replicated. The current sequence number preferably corresponds to a tally of transactions or operations the tag has conducted. The host typically sends a sequence number to the tag with each command. If the sequence number sent by the host does not correspond to that stored in this register, the command is ignored. Typically, the host will include a new sequence number, one plus the current sequence number, to signify a new command affecting store data is being sent. Read commands preferably include the current sequence number. The register in the tag is updated accordingly. The sequence number adds further security by ensuring the host 300 is transmitting proper data and/or commands to the tag, that no unauthorized communications have occurred and that each previous communication between the host and tag was properly received and acted on.

DES Password

The password prevents unauthorized replacement of the main tag key in the DES Module. The password is used to gain access to the key, while the key is what is used by the cryptography electronics to encrypt information. If an attacker could replace the main tag key, various registers and memory locations could be altered to allow the attacker to enjoy secondary services such as loyalty points and other benefits from sources other than the host without having earned them. A loyalty plan may be a program where customers collect bonus points based on purchases and transactions. The bonus points may be stored on the tag and redeemed as desired for benefits or privileges at the fuel station store or any other local source 32. Notably, even if an attacker could replace the main tag key, an authentication check with the host 300 would fail since the host 300 would generate the original main tag key or one authorized and updated by the host 300. For authorization and other secure transactions, the host 300 and tag 100 must have or be able to generate identical keys. Since some loyalty plans require a non-secure read function, the DES password may be useful to access read-only information stored on the tag 100.

Preferably, the DES password register can only be directly written once. After that, the tag cryptography electronics 104 refuse further attempts to write to the DES password register. The DES password is modified by the tag 100 when a main tag key is initially written to the tag 100. The tag 100 preferably uses the new main tag key to encrypt the previous DES password and write the encrypted result into the DES password register to form a new password.

Main Tag Key

As noted, the main tag key is preferably an 8 byte standard DES cryptography key that is used by the tag 100 for both encryption and decryption. The main tag key is loaded in the tag 100 with a set DES key command as discussed in the "DES commands section" below.

User Memory Size

The memory size register stores a value representative of the amount of memory available in the tag cryptography electronics 104. The memory size is preferably reported in blocks, with each block having 8 bytes of data.

DES Version Number

The version number register is a read only register and stores the cryptography electronics 104 software and/or hardware version.

Begin and End Block Registers

The begin and end block registers are generally set by the tag programmer to reflect desired groupings of the user memory in the memory 120 of the tag cryptography electronics 104. These registers preferably reflect the begin and end blocks of the groups starting from memory location zero. A group is unused or does not exist if the begin and end block registers for that group are both set to zero. Preferably, there are four groups and one set of Begin and End registers for each group.

Group Mode Register

Figure 7:
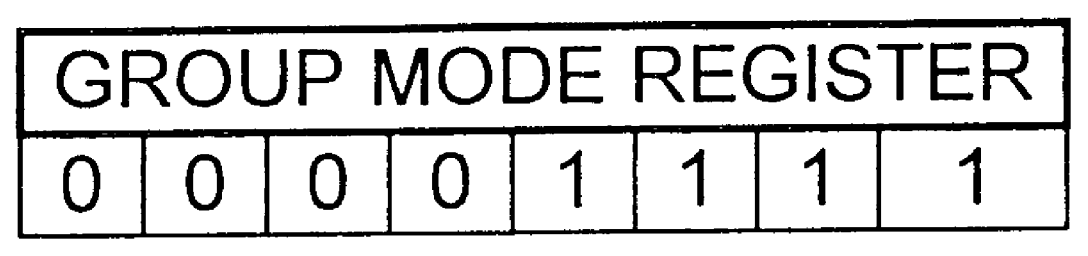

The group mode register defines the acceptable commands for a particular group. There is a group mode register for each of the groups. Preferably, there are 8 total commands selectable by this register. These commands and their respective bit positions are listed in FIG. 6. The group mode register is an 8 bit register. Each bit position in the register refers to one specific command. A logical '1' in a given bit position indicates that the respective command is selected for the respective group. For example, the group mode register depicted in FIG. 7 is programmed to 0F hexadecimal (HEX). This means that the group will accept all four of the secure commands (read, subtract, add, and write) but none of the unsecure commands.

DES TAG COMMANDS

Figure 9A:
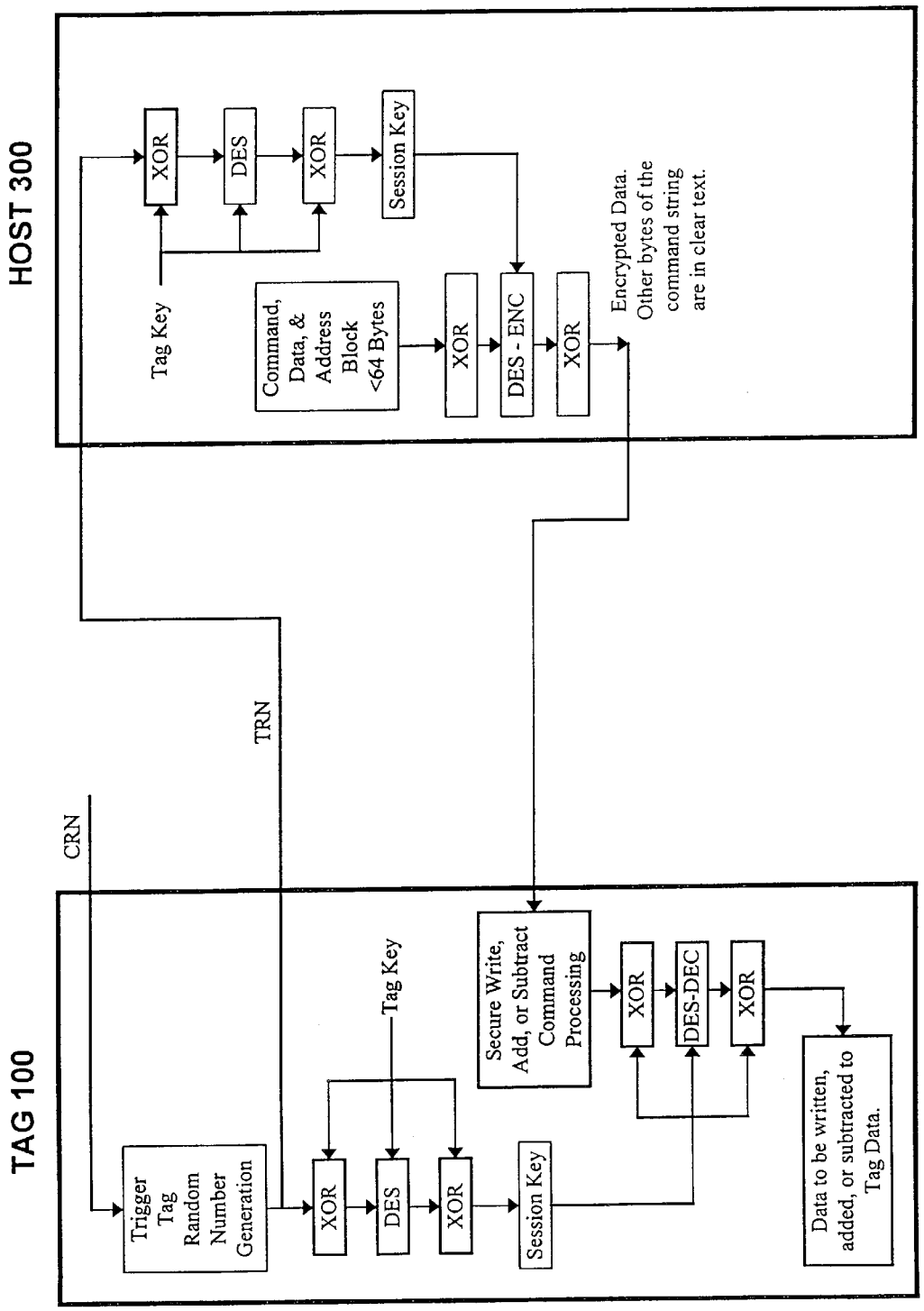
FIG. 9A depicts a preferred process for securely writing, adding or subtracting data to a tag from the host, omitting the POS device depicts for the sake of simplicity.

The tag 100 may receive and respond to various cryptography related commands, such as those shown in FIG. 8. The DES commands in bold preferably require cryptography, either encryption or decryption, to encode or decode data As depicted in FIG. 9A, when the tag 100 is presented with a random number (CRN) from the POS device 200 during an authentication cycle, the tag 100 also generates a tag random number (TRN) that is sent to the host 300 through the POS device 200. This tag random number (TRN) is used in the tag 100 to generate a session key (SK) from the main tag key of the tag 100. The host 300 uses its knowledge of the tag's original main tag key to generate the same session key (SK) using the tag random number (TRN). The session key (SK) is used to encrypt or decrypt actual data and authenticator data transferred between the tag 100 and the host 300. Actual data represents the actual information or commands to be transferred. Authenticator data is the result of a security or checking process performed on the actual data to allow the receiving device, whether the host 300 or tag 100, to assure accuracy of data transmission. The process is described in detail below.

The session key (SK) is preferably used a maximum of four times before it is destroyed in the tag 100. After that, a new tag random number (TRN) is generated by performing another tag authentication cycle using a new random number (CRN) generated by the POS device 200. Requesting a tag authentication cycle produces a new tag random number (TRN) regardless of how many times it has been used. Note that the tag authentication cycle or process uses the encrypt random number command, the third command listed in FIG. 8, to encrypt the random number (CRN) received from the POS device 200.

For secure commands transferring data from the host 300 to the tag 100. Through the POS device 200, data is encrypted at the host with the session key (SK) generated during the tag authentication process and decrypted at the tag 100 using an identically calculated session key (SK). As noted, the session key (SK) is generated at the host 300 by encrypting the tag random number (TRN) with the main tag key. Session key (SK) generation may include other logic functions in addition to encryption. In this context, encryption is meant to include any additional functions used to arrive at the session key (SK) or like value. Data to be authenticated is generally 8 bytes long and is assumed to be numeric but generally no checks are performed to ensure that it is.

The authenticator data is preferably formed by concatenating a 4 byte, 32 bit cyclic redundancy check (a super checksum process referred to as CRC) on the original data, with 4 bytes of random numbers generated by the host 300. The CRC occupies the least significant 4 bytes of the 8 byte authenticator data. The authenticator data should also be encrypted by the host 300 using the tag's session key (SK). When the tag 100 decrypts the authenticator data and checks the accuracy of the transfer, the 4 bytes of random numbers generated by the host are discarded and only the CRC bytes are used in checking the data.

Figure 9B:
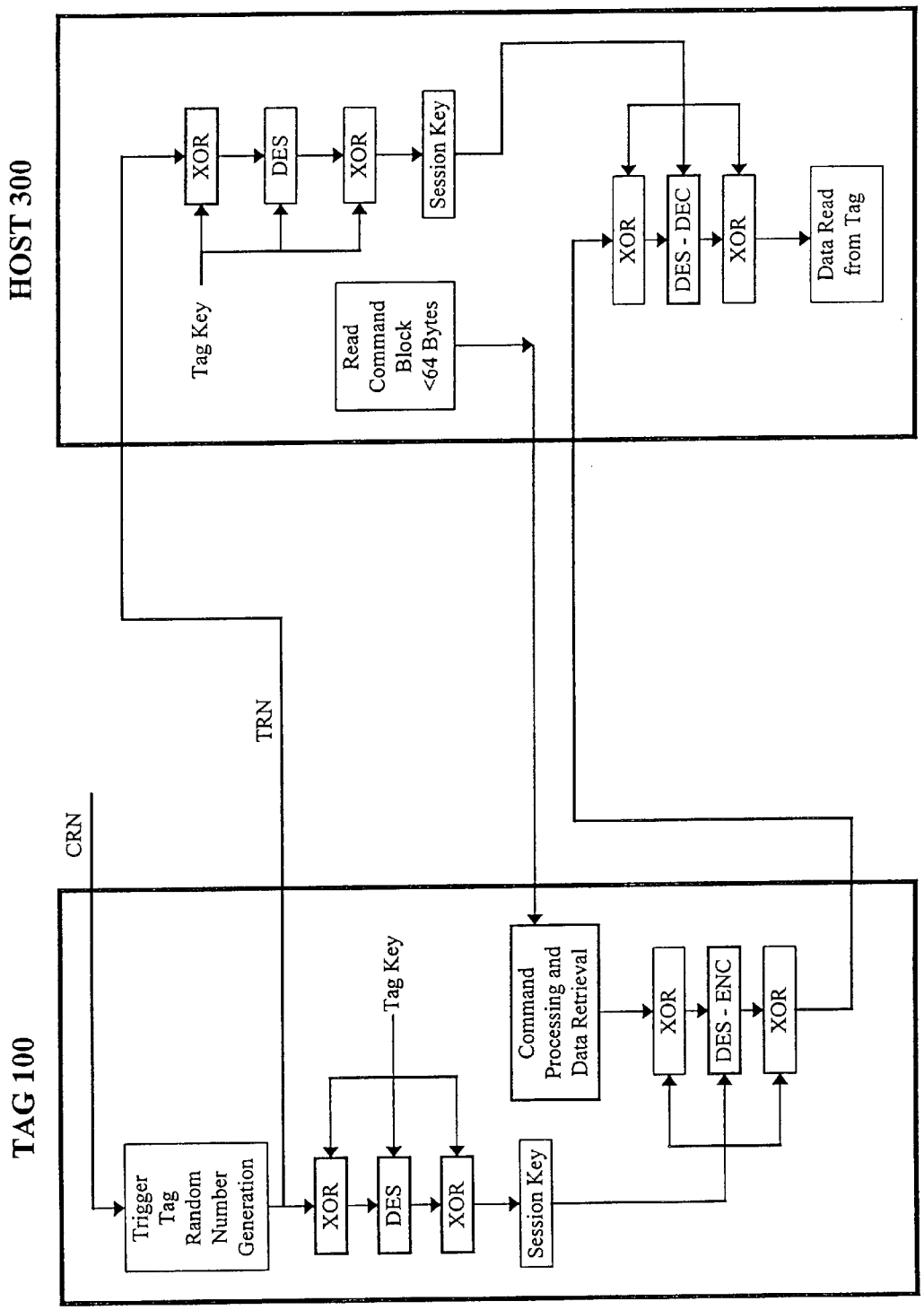
FIG. 9B depicts a preferred process for securely reading data from the tag with the host, omitting the POS device for the sake of simplicity.

For secure commands transferring data from the tag 100 to the host 300. through the POS device 200, as shown in FIG. 9B, data is encrypted with the session key (SK) generated during the tag authentication process. Again, the session key (SK) is generated by encrypting the tag random number (TRN) with the main tag key. The data to be authenticated is generally 8 bytes long and assumed to be numeric. As above, authenticator data is used to check the accuracy of the data transfer. The authenticator data is formed by concatenating a 4 byte, 32 bit CRC on the data, with 4 bytes of random numbers generated by the tag 100. The CRC occupies the least significant 4 bytes of the 8 byte authenticator data The authenticator data is encrypted by the tag 100 using the tag's session key (SK). When the host 300 decrypts the authenticator data, the 4 bytes of random numbers generated by the tag 100 are discarded and only the CRC bytes are used in checking the data. Additional error checking and detection for either tag-to-host or host-to-tag communications is provided by using a longitudinal redundancy check (LRC). An LRC appended to each communications block is formed by performing a byte-wise binary addition of every preceding byte of data in the communications block. Carries from the additions are discarded.

Set DES Password

The set DES password command allows a tag programmer to load the DES or other password in the tag 100. The tag 100 will not accept a main tag key if the password is zero. The password is set to zero at initialization. The password can only be set once. After it is set, new passwords are generated by the tag. The following command protocol sequence is recommended from a tag programmer associated with the host 300 to initially set the DES password:

```
UNSIGNED CHAR Set_DES_Password = E1    (command to set password);
UNSIGNED CHAR DES_Password[8]          (actual 8 byte password); and
UNSIGNED CHAR LRC                      (checksum).
```

Possible replies from the tag 100 are:

UNSIGNED CHAR Command_Accepted=ACK; and

UNSIGNED CHAR Command_Not_Accepted=NAK.

Set DES Key

The set DES key command allows the tag programmer to directly set the main tag key for use in all subsequent secure communications with the tag 100. Preferably, the DES password is sent as part of this command sequence. The command protocol sequence follows:

DES Module. The DES password is given as part of this command. This command may be configured to work even if the DES password is zero (i.e. before the DES password is loaded into the tag cryptography electronics 104). Note that the block numbers defined in this command are absolute, start from block zero (0) and do not relate to the group number. The begin and end block numbers may overlap.

```
UNSIGNED CHAR Set_DES_Key = E2    (command to set main tag key);
UNSIGNED CHAR DES_Password[8]     (send actual password);
UNSIGNED CHAR DES_Key[8]          (send main tag key); and
UNSIGNED CHAR LRC                 (checksum).
```

```
UNSIGNED CHAR Set_DES_Key = E3              (set main tag key);
UNSIGNED CHAR DES_Password[8]               (send password);
UNSIGNED SHORT BEGIN_BLOCK_GROUP_0          (start first block);
UNSIGNED SHORT END_BLOCK_GROUP_0            (end first block);
UNSIGNED CHAR GROUP_MODE_0                  (define group mode);
UNSIGNED SHORT BEGIN_BLOCK_GROUP_1          (start second block);
UNSIGNED SHORT END_BLOCK_GROUP_1            (end second block);
UNSIGNED CHAR GROUP_MODE_1                  (define group mode);
UNSIGNED SHORT BEGIN_BLOCK_GROUP_2          (start third block);
UNSIGNED SHORT END_BLOCK_GROUP_2            (end third block);
UNSIGNED CHAR GROUP_MODE_2                  (define group mode);
UNSIGNED SHORT BEGIN_BLOCK_GROUP_3          (start fourth block);
UNSIGNED SHORT END_BLOCK_GROUP_3            (end fourth block);
UNSIGNED CHAR GROUP_MODE_3                  (define group mode); and
UNSIGNED CHAR LRC                           (checksum).
```

Possible replies from the tag 100 are:

UNSIGNED CHAR Command_Accepted=ACK; and

UNSIGNED CHAR Command_Not_Accepted=NAK.

When the tag cryptography electronics 104 of the tag 100 accept a main tag key, the main tag key is used to encrypt the current DES password. The result of that encryption is then stored as the new DES password. In addition, each time a DES key is accepted, the DES key counter is incremented by one. The DES key counter is zeroed at initial power on for the tag, and cannot be directly written or modified except by writing a new DES key to the tag cryptography electronics 104.

Set Group Registers

The set group registers command allows the tag programmer to set up group information for the user memory in the The possible replies from the tag 100 are:

UNSIGNED CHAR Command_Accepted=ACK; and

UNSIGNED CHAR Command_Not_Accepted=NAK.

Encrypt Random Number

The encrypt random number command requests the tag 100 to encrypt the Pos device random number (CRN) sent to the tag 100 with the tag's main tag key. Preferably, the tag 100 replies by sending the encrypted random number (ECRN) and the tag random number (TRN) generated by the tag 100. Generation of the tag random number (TRN) by the tag 100 is preferably triggered upon receipt of the encrypt random number command from the POS device 200. For maximum security, the tag random number (TRN) is not mathematically related to the POS device 200 random number (CRN). Again, the tag random number (TRN) is used to generate a session key (SK) in the tag 100 and at the host to encrypt and decrypt data.

A typical command protocol sequence for encrypting the POS random number (CRN) follows:

```
UNSIGNED CHAR Encrypt_Random_Number = E4   (command to encrypt CRN);
UNSIGNED CHAR Tag_Random_Number[8]         (generate TRN); and
UNSIGNED CHAR LRC                          (checksum).
```

The possible replies from the tag 100 are:

```
UNSIGNED CHAR Command_Not_Accepted = NAK; or
UNSIGNED CHAR Command_Accepted = ACK;
UNSIGNED CHAR Currrent_Sequence_Number     (increment sequence number);
UNSIGNED CHAR Encrypted_Random_Number[8]   (send encrypted CRN [ECRN]);
UNSIGNED CHAR Tag_Random_Number[8]         (send TRN); and
UNSIGNED CHAR LRC                          (checksum).
```

Secure Write Data

The secure write data command causes the tag cryptography electronics 104 to store data that is part of this command. The block number in this command is relative to a group and starts from block 0.

The following protocol command sequence securely writes data to a tag 100 according to FIG. 9:

```
UNSIGNED CHAR Secure_Write_Data = E5       (command to write data to tag);
UNSIGNED CHAR Sequence_Number              (increment sequence number);
UNSIGNED CHAR Group_Number                 (select group to be written);
UNSIGNED SHORT Block_Number                (select block to be written in group);
UNSIGNED CHAR Data[8]                      (send 8 bytes of encrypted data);
UNSIGNED CHAR Authenticator_Block[8]       (send 8 bytes of encrypted
                                            authenticator data); and
UNSIGNED CHAR LRC                          (checksum).
```

The possible replies from the tag 100 are:

UNSIGNED CHAR Command_Accepted=ACK; and

UNSIGNED CHAR Command_Not_Accepted=NAK.

Secure Add Data

The secure add data command causes the tag cryptography electronics 104 to add data that is part of this command to the data that is already stored in the tag cryptography electronics 104. The sequence number sent from the host 300 is one higher than the sequence number stored in the tag cryptography electronics 104. The Add function adds the data in the block to the data in the command and stores the result in the block. The addition is performed in binary coded decimal with carries across bytes. The carry from the most significant byte (MSB) is dropped. If the addition would result in a carry out of the last byte, then the addition is not performed. Note that the block number in this command is relative to a group and starts from block 0.

A sample protocol command sequence follows:

```
UNSIGNED CHAR Secure_Add_Data = E6         (send command);
UNSIGNED SHORT New_Sequence_number         (send new sequence number);
UNSIGNED CHAR Group_Number                 (select group);
UNSIGNED SHORT Block_Number                (select block);
UNSIGNED CHAR Data[8]                      (send 8 byte encrypted data);
UNSIGNED CHAR Authenticator_Block[8]       (send 8 byte encrypted authenticator
                                            data; and
UNSIGNED CHAR LRC                          (checksum).
```

The possible replies from the tag 100 are:
UNSIGNED CHAR Command_Accepted=ACK; and
UNSIGNED CHAR Command_Not_Accepted=NAK.

Secure Subtract Data

The secure subtract data command causes the tag cryptography electronics 104 to perform a subtraction from the secure data storage area in the tag cryptography electronics 104. Preferably, the sequence number is one higher than the sequence number stored in the tag cryptography electronics 104. The subtract function subtracts the number in the command from the number in the block and stores the result in the block. The subtraction is in binary format with borrows across bytes. If the subtraction results in a borrow from the last byte, then the subtraction is performed. Note that the block number in this command is relative to a group and starts from block 0.

A command protocol sequence follows:

| | |
|---|---|
| UNSIGNED CHAR Subtract_Data = E7 | (send command); |
| UNSIGNED SHORT New_Sequence_Number | (send new sequence number); |
| UNSIGNED CHAR Group_Number | (select group); |
| UNSIGNED SHORT Block_Number | (select block); |
| UNSIGNED CHAR Data[8] | (send encrypted data); |
| UNSIGNED CHAR Authenticator_Block[8] | (send encrypted authenticator); and |
| UNSIGNED CHAR LRC. | |

The possible replies from the tag 100 are:

UNSIGNED CHAR Command_Accepted=ACK; and

UNSIGNED CHAR Command_Not_Accepted=NAK.

Secure Read Data

This commands returns data stored in a secure read memory area of the tag cryptography electronics 104 to the POS device 200. Generally, the data size is assumed to be one block or 8 bytes. Note that the block number in this command is relative to a group and starts from block 0.

A command protocol sequence follows:

| | |
|---|---|
| UNSIGNED CHAR Read_Data = E8 | (send command); |
| UNSIGNED CHAR Group_Number | (select group); |
| UNSIGNED SHORT Block_Number | (select block); and |
| UNSIONED CHAR LRC | (checksum). |

The possible replies from the tag 100 are:

| | |
|---|---|
| UNSIGNED CHAR Command_Not_Accepted = NAK; or | |
| UNSIGNED CHAR Command_Accepted = ACK; | |
| UNSIGNED CHAR Current_Sequence_Number | (send current sequence number); |
| UNSIGNED CHAR DES_Key_Counter | (send DES key counter value); |
| UNSIGNED CHAR Data[8]/*encrypted*/ | (send encrypted data); |
| UNSIGNED CHAR Authenticator_Block[8] /*encrypted*/ | (send encrypted authentic or data); and |
| UNSIGNED CHAR LRC | (checksum). |

Unsecure Write Data

The unsecure write data command causes the tag cryptography electronics 104 to store data that is part of this command. Note that the block number in this command is relative to a group and starts from block 0.

A command protocol sequence follows;

| | |
|---|---|
| UNSIGNED CHAR Secure_Write_Data = E9 | (send command); |
| UNSIGNED CHAR Sequence_Number | (send sequence number); |
| UNSIGNED CHAR Group_Number | (select group); |
| UNSIGNED SHORT Block_Number | (select block); |
| UNSIGNED CHAR Data[8] | (send data); and |
| UNSIGNED CHAR LRC | (checksum). |

The possible replies from the tag 100 are:

UNSIGNED CHAR Command_Accepted=ACK; and

UNSIGNED CHAR Command_Not_Accepted=NAK.

Unsecure Add Data

The unsecure add data command causes the tag cryptography electronics 104 to add data that is part of this command to the data that is already in storage in the tag cryptography electronics 104. The sequence number is one higher than the sequence number stored in the tag cryptography electronics 104. The Add function adds the data in the block to the data in the command and stores the result in the block. The addition is in binary coded decimal format with carries across bytes. Any carries from the MSBs is lost. If the addition would result in a carry out of the last byte, then the addition will not be performed. Note that the block number in this command is relative to a group and starts from block 0.

The command protocol sequence would be:

| | |
|---|---|
| UNSIGNED CHAR Secure_Add_Data = EA | (send command); |
| UNSIGNED SHORT New_Sequence_number | (send new sequence number); |
| UNSIGNED CHAR Group_Number | (select group); |
| UNSIGNED SHORT Block_Number | (select block); |
| UNSIGNED CHAR Data[8] | (send data); and |
| UNSIGNED CHAR LRC | (checksum). |

The possible replies from the tag 100 are:

UNSIGNED CHAR Command_Accepted=ACK; and

UNSIGNED CHAR Command_Not_Accepted=NAK.

Unsecure Subtract Data

The unsecure subtract data command causes the tag cryptography electronics 104 to perform a subtraction from the data stored in the tag cryptography electronics 104. The sequence number is one higher than the sequence number stored in the tag cryptography electronics 104. The data is not secured, and there are no security checks or encryption on this command. The Subtract function subtracts the number in the command from the number in the block and stores the result in the block. The subtraction is in binary coded decimal format with borrows across bytes. If the subtract would result in a borrow from the last byte, then the subtraction is performed. Note that the block number in this command is relative to a group and starts from block 0.

A command protocol sequence follows:

| | |
|---|---|
| UNSIGNED CHAR Subtract_Data = EB | (send command); |
| UNSIGNED SHORT New_Sequence_Number | (send new sequence number); |
| UNSIGNED CHAR Group_Number | (select group); |
| UNSIGNED SHORT Block_Number | (select block); |
| UNSIGNED CHAR Data[8] | (send data); and |
| UNSIGNED CHAR LRC | (checksum). |

The possible replies from the tag 100 are:
UNSIGNED CHAR Command_Accepted=ACK; or
UNSIGNED CHAR Command_Not_Accepted=NAK.

Unsecure Read Data

The unsecure read data command returns data stored in the tag cryptography electronics 104 to the POS device 200. The data size is assumed to be one block or 8 bytes. Note that the block number in this command is relative to a group and starts from block 0.

A command protocol sequence follows:

| | |
|---|---|
| UNSIGNED CHAR Read_Data = EC | (send command); |
| UNSIGNED SHORT Block_Number | (select block); and |
| UNSIGNED CHAR LRC | (checksum). |

The possible replies from the tag 100 are:

| | |
|---|---|
| UNSIGNED CHAR Command_Not_Accepted = NAK; or | |
| UNSIGNED CHAR Command_Accepted = ACK; | |
| UNSIGNED CHAR Current_Sequence_Number | (send current sequence number); |
| UNSIGNED CHAR DES_Key_Counter | (send DES key counter); |
| UNSIGNED CHAR Data[8] | (send data); and |
| UNSIGNED CHAR LRC | (checksum). |

Read DES Module Status

The read DES module status command reads the tag status registers and also returns the tag cryptography electronics 104 version number.

CRYPTOGRAPHY MEMORY ORGANIZATION

The tag user memory 120 is preferably configured to include numeric counters or registers. Each counter or register is called a block. Generally, each block is 8 bytes long. There are x blocks of memory in the tag depending on the CPU selected. Data is stored in the blocks in Big Endian mode, that is, the lowest address is the most significant byte of data As noted, the tag user memory 120 is divided into four different areas called groups. The commands available for each group depend on the content of the Group Mode register for that group. It is permissible for the group begin block and end block numbers to overlap. In these instances, groups can share blocks and the data stored therein.

Add and subtract operations are performed in binary coded decimal (BCD). Typically, each 8 byte block is capable of storing a maximum of 16 decimal numbers. If there are x number of bytes in the user memory 120, then there are x/8 blocks of data. Blocks are numbered from 0 to (x/8)–1. A detailed example is given below on block divisions and possible uses of the groups.

In the following example, there is 1024 bytes of user memory in the cryptography electronics 104 assuming there are 128 memory blocks. The group registers would be setup as follows:

| | |
|---|---|
| UNSIGNED SHORT BEGIN_BLOCK_GROUP_0 = | 0x0000; |
| UNSIGNED SHORT END_BLOCK_GROUP_0 = | 0x001f; |
| UNSIGNED CHAR GROUP_MODE_0 = | 0x0f |
| UNSIGNED SHORT BEGIN_BLOCK_GROUP_1 = | 0x0020; |
| UNSIGNED SHORT END_BLOCK_GROUP_1 = | 0x003f; |
| UNSIGNED CHAR GROUP_MODE_1 = | 0x87 |
| UNSIGNED SHORT BEGIN_BLOCK_GROUP_2 = | 0x0040; |
| UNSIGNED SHORT END_BLOCK_GROUP_2 = | 0x005f |
| UNSIGNED CHAR GROUP_MODE_2 = | 0xc3 |
| UNSIGNED SHORT BEGIN_BLOCK_GROUP_3 = | 0x0060; |
| UNSIGNED SHORT END_BLOCK_GROUP_3 = | 0x007f; |
| UNSIGNED CHAR GROUP_MODE_3 = | 0x81 |

With reference to FIGS. 10 and 11 and the example setup, the first group of blocks is composed of the first 32 blocks in the user memory, numbered from 0 to 31. An attempt to perform an unsecure read or subtract function to these blocks will not be accepted. The data is preferably stored as clear text data. A different session key (SK) is used to manipulate the data at each session rather than expose the same key to constant scrutiny.

The second group of blocks is composed of 32 blocks numbered from 32 to 63. This group of blocks accepts an unsecure read function. An attempt to perform an unsecure add or subtract operation to one of these blocks will not be accepted. This group of blocks is preferably used as a cash storage device and other applications analogous to prepaid cards or smartcards.

The third group of blocks is composed of 32 blocks numbered from 64 to 95. This group of blocks may accept both an unsecure read function and an unsecure subtract function. Note that secure write and add functions are required. This group of blocks is preferably a data storage location for loyalty points. A local source 32 (or even the POS device 200 or local station) providing benefits in exchange for the loyalty points can read and subtract from data stored in this group, but is not able to write or add to the data stored in this group.

The last group of blocks is composed of 32 blocks numbered from 96 to 127 and will accept an unsecure read function. An attempt to perform an add or subtract function, either secure or unsecure, will not be accepted. The write operation must be secure. A block configured in this manner is useful for storing customer information on the tag 100 which is readily accessible by sources other than the host 300. The write operation is secure to prevent unauthorized sources, typically those other than the host 300, from altering customer information. FIGS. 10 and 11 include preferable commands and the recommended usage for each group in this example.

USER MEMORY ORGANIZATION

In an active tag 100, that is one having an internal source of power, user memory 120 is preferably 256 bytes long. The memory 120 is preferably divided into three different partitions as allowed by the three different sets of partition descriptor registers. Each partition requires a different password for various types of access by various sources. FIG. 12 illustrates possible partitions for the tag 100 and outlines the recommended requirements for the respective passwords for the different partitions. Similar setup is available for passive tag and is limited only to the communication technology's ability to operate the tags control and memory structure.

The various partitions and the associated passwords provide varying types of access for different sources adapted to read, write or modify data in the tag 100. Preferably, there are three passwords, SuperUser, Administrator and User. The SuperUser password is known only by the host 300. Each tag 100 will have a different SuperUser password, which is calculated from the tag ID. The first partition, partition 0, associated with the SuperUser password may include customer definition data fields as shown in FIGS. 13A and 13B. Partition 0 can be read by local sources without the SuperUser password. However, only the host 300, using the SuperUser password, may write data to this partition or otherwise modify data therein.

The host network 300 may also generate a host authentication code from the tag ID. The SuperUser password and host authentication code will be different for each tag 100 and may be used during authorization or secure data transfer between the tag 100 and the host 300 when DES encryption or the primary cryptography technique is unavailable or unnecessary. The authentication code simply provides another security feature for data transfer between the tag 100 and host 300.

The second partition, partition number 1, allows the host 300, POS device 200 or other local sources to access and modify data in the tag 100. The second partition preferably includes local and host authentication codes. The POS device 200 can calculate the administrator password from the tag ID. The local authentication code is used for authorization for the various local sources, including the POS device 200, whereas the host authentication code is sent to the host for authentication. For example, the POS device 200 can calculate the administrator password for partition number 1 from the tag ID and then read the local and host authentication code. If local transactions are desired, the POS device 200 checks the local authentication code and authorizes a local transaction accordingly. If a host related transaction is necessary, the host authentication code is passed on to the host for authentication.

Preferably, an administrative DES key is used to generate the administrator password for the second partition (partition number 1). Yet another DES key is used to generate the local authentication code. Thus, the administrator password and the local authentication code is generated with additional DES keys and the tag ID. The administrator Partition password and the local authentication code should be unique for each tag. FIG. 14 provides a typical layout for the second partition, (partition number 1).

The third partition, partition number 2, provides a scratch pad for any of the various sources communicating with the tag 100. The scratch pad provides complete read and write access for any of the local sources. The scratch pad can be used for virtually any type of application where security is not of utmost importance. Notably, this portion of memory allows virtually any source to communicate with the tag, especially those without cryptography capabilities. The scratch pad feature expands tag compatibility with virtually any type of source having remote intelligent communication capability. Preferably, the scratch pad area allows a local system to save information to be read a short time later at the same location or station. Typically, the scratch pad is 32 bytes long, and its organization of data fields, if any, is determined by the local system. A User password may be used to limit access to those having a password and provide modest security. The User password for the user partition is preferably the same in all tags. Typically, the POS device operator or tag issuer will supply the password. FIG. 15 shows a typical layout of the third partition, (partition number 2).

PREFERRED PASSWORD AND AUTHENTICATION CODE GENERATION

Figure 16:
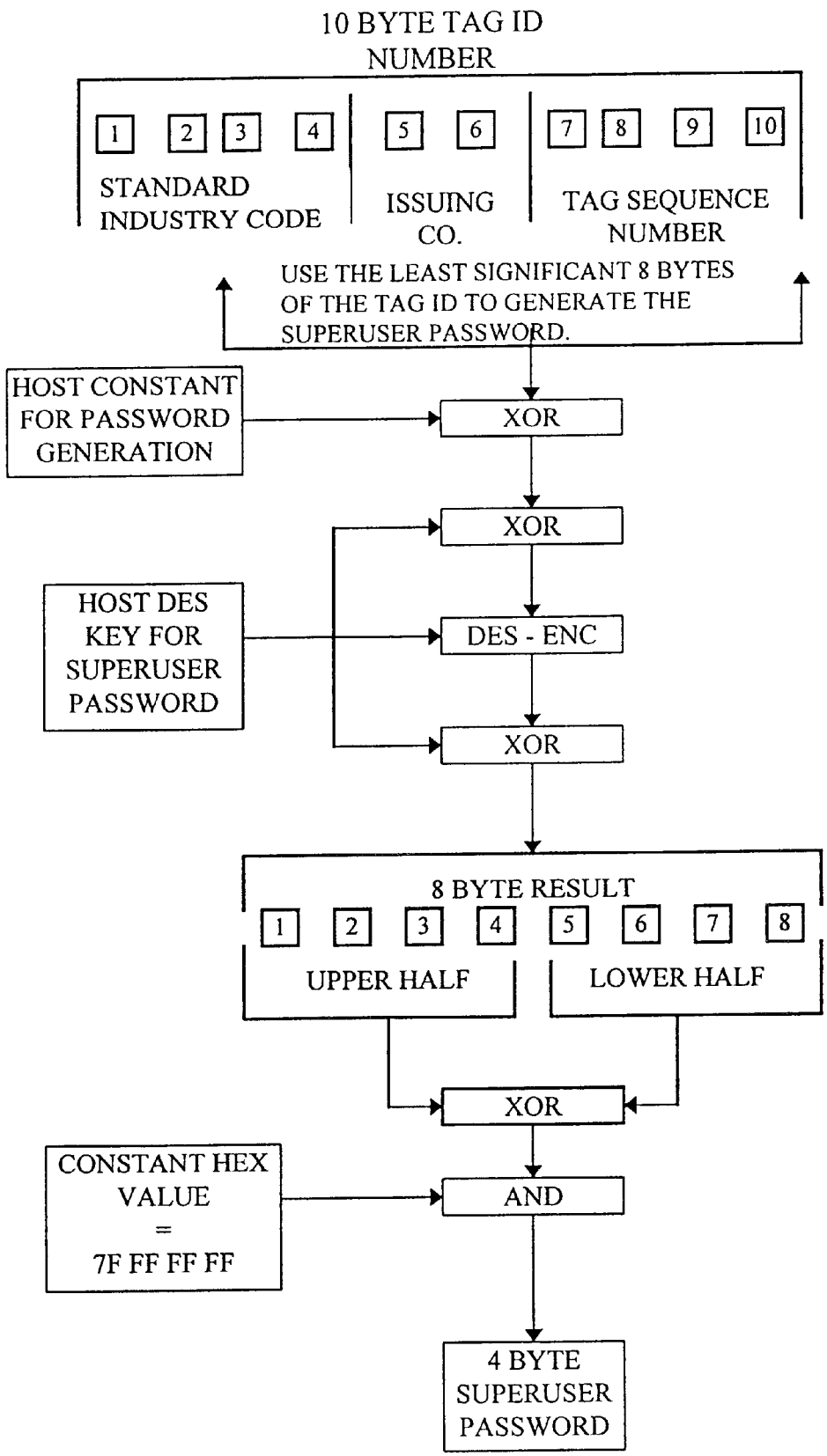
FIG. 16 depicts the preferred process for generating a Super User password for partition number 0 as defined in FIG. 12.

The SuperUser password for the SuperUser partition number 0 is generated by the host 300 and is preferably unknown to the local sources, including the POS device 200. The SuperUser password is different for each tag and is based on the tag ID. A preferred method of generating this password is shown in FIG. 16.

In order to generate the SuperUser password the least significant 8 bytes of the tag ID are XORed with an 8 byte constant chosen by the host 300. The result is then XORed with a unique host password generation key, DES encrypted with the host password generation key and XORed again with the host password generation key. The result of this is an 8 byte value. This 8 byte value is then split into two parts consisting of the least significant 4 bytes (lower half) and the most significant 4 bytes (upper half). These two halves are XORed together and then ANDed with the 4 byte hexadecimal constant 7F FF FF FF. This has the effect of making the most significant bit of the 32 bit value equal to a logical zero. The result of this operation is the tag's SuperUser Password that is injected and stored in to tag 100 during initialization.

Figure 17:
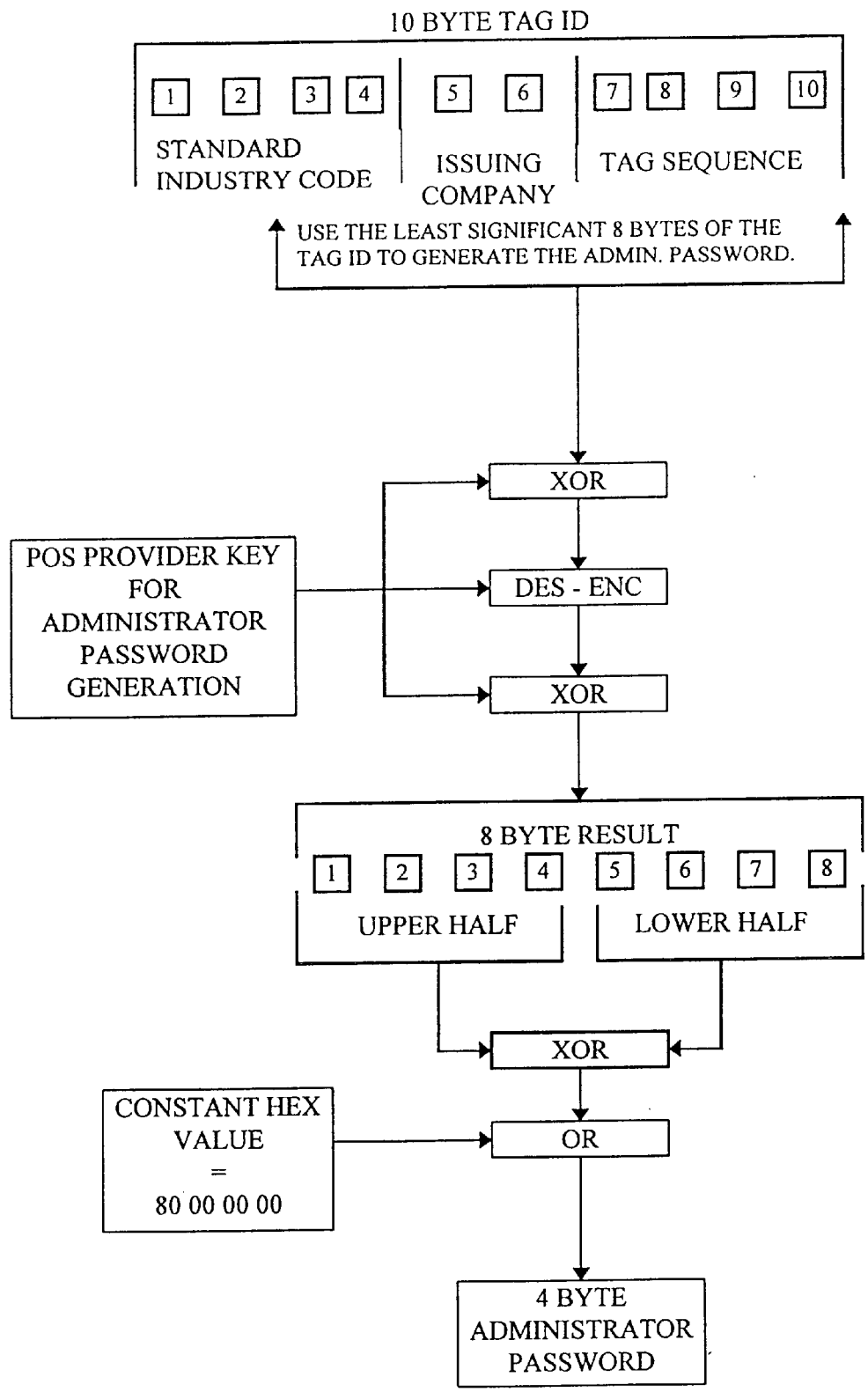
FIG. 17 depicts the preferred process for generating an Administrator password for partition number 1 as defined in FIG. 12.
Figure 18:
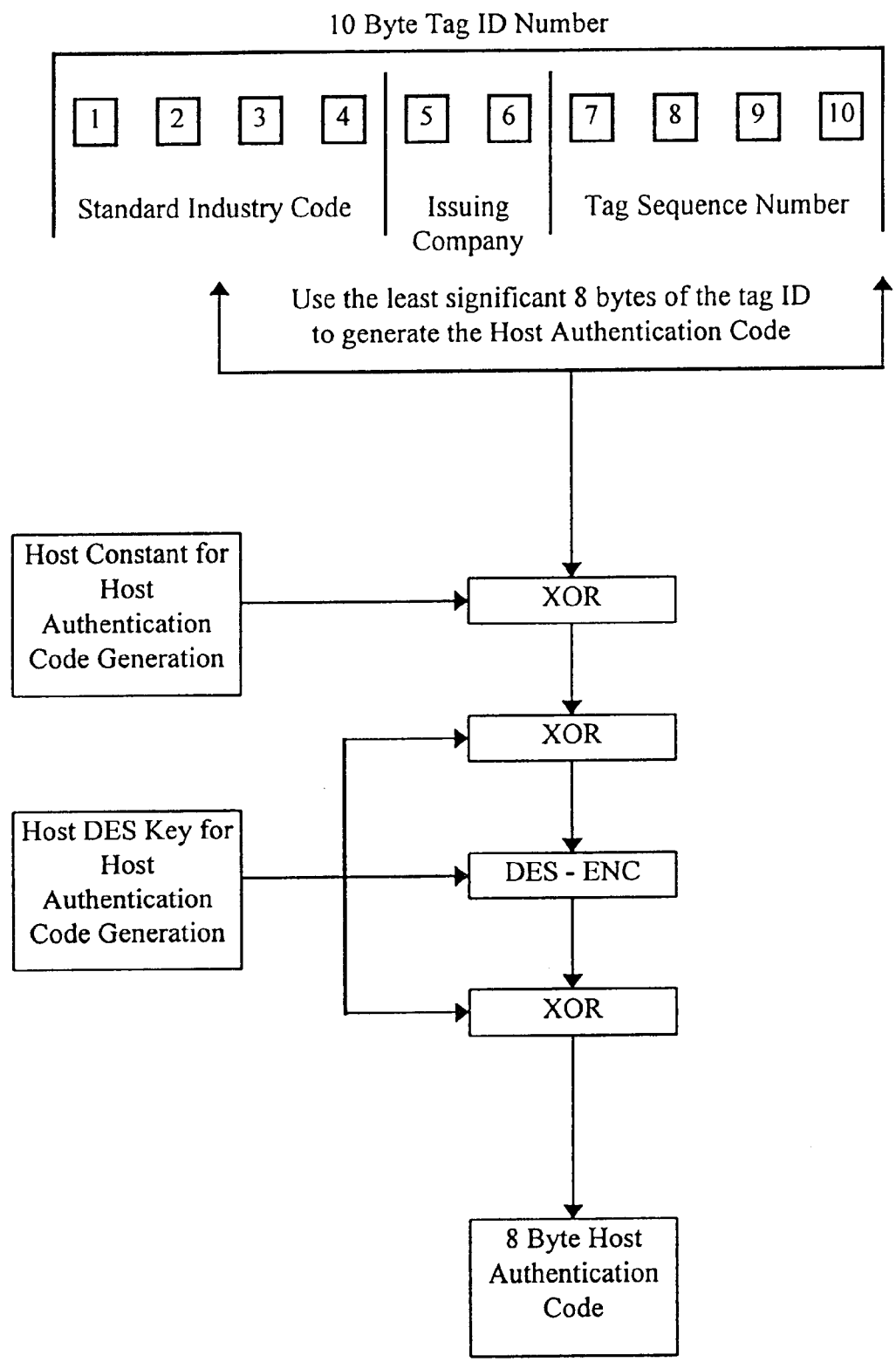
FIG. 18 depicts the preferred process for generating the host authentication code.

The administrator password is generated by the host 300 at the time the tag is initialized. Each tag gets a different administrator password, which is calculated from the tag ID. The generation process uses a unique administrator DES key, preferably supplied by the POS device or dispenser provider. The administrator password generation process is shown in FIG. 17. The administrator password is preferably generated by the POS device 200 to allow read access to the local and host authentication codes stored in partition number 1.

In order to generate the administrator password the least significant 8 bytes of the tag ID are first XORed with the POS provider password generation key, then DES encrypted with the POS provider password generation key, and then XORed again with the POS provider password generation key. The result of this is an 8 byte value. The 8 byte value is then split into two parts consisting of the least significant 4 bytes (lower half) and the most significant 4 bytes (upper half). These two halves are XORed together and then ORed with the 4 byte hexadecimal constant 80 00 00 00. This has the effect of making the most significant bit of the 32 bit value equal to a logical one. The result of this operation is the tag administrator password that is injected and stored in the tag.

The host authentication code is read by the POS device 200 from partition 1, the administrator partition. The code is transmitted to the host 300 to authenticate the tag. Each tag has a different authentication code, which is generated from the tag ID. A preferred method of generating this code is shown in FIG. 8.

In order to generate the host authentication code the least significant 8 bytes of the tag ID are XORed with an 8 byte constant chosen by the host. The result is then XORed with a unique host authentication code generations DES encrypted with the host authentication code generation key, and XORed again with the host authentication code generation key. The result of this is an 8 byte value. This 8 byte value is stored in the administrator partition of the tag 100 as the host authentication code.

Figure 19:
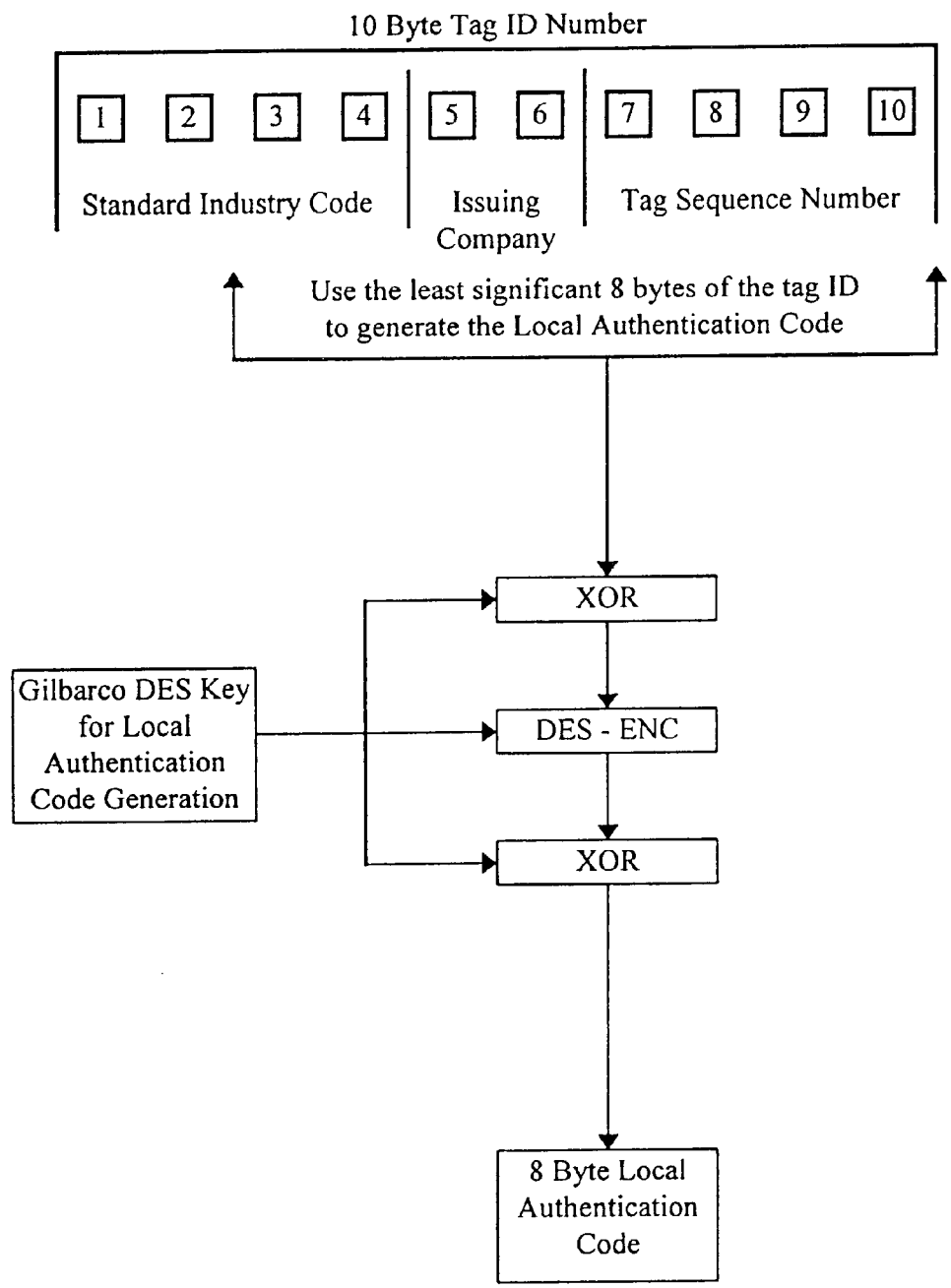
FIG. 19 depicts the preferred process for generating the local authentication code.

The local authentication code is also generated by the host 300 at the time the tag is initialized. Each tag 100 gets a different local authentication code that is calculated from the tag ID. Preferably, the generation process uses a DES key supplied by POS device provider for this purpose. The local authentication code Generation Process is shown in FIG. 19. The local authentication code can be generated by the POS device to allow the local system to authenticate the tag.

In order to generate the local authentication code the least significant 8 bytes of the tag ID are first XORed with the local authentication code generator DES key, then DES encrypted with the local authentication code generator DES key, and then XORed again with the local authentication code generator key. The result is an 8 byte value that is the local authentication code. The local authentication code is stored in the tag's administrator partition.

Notably, the convoluted processes disclosed herein to determine and calculate the various cryptography keys, codes, and numbers, such as the ID number, are for example only. The combination of cryptography and logical operations may be reduced, amplified or modified to provide the desired results.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A cryptography key generator for generating keys used in remote communications devices comprising:
   a remote communication device identification number generator adapted to generate unique identification numbers for a plurality of remote communication devices
   a memory having at least one master encryption key stored therein;
   cryptography electronics associated with a host processing system adapted to encrypt a function of an identification number using said at least one master encryption key to provide a main remote communication device key; and
   communication electronics associated with said cryptography electronics adapted to transmit said remote communication device identification number and said remote communication device key to a corresponding remote communication device;
   wherein said identification number generator includes an incremental sequence counter, said incremental sequence counter adapted to provide a tag sequence number used to form at least part of said identification number.

2. The cryptography key generator of claim 1 wherein said identification number generator forms said identification number by including an industry code signifying a type of industry from which the corresponding remote communication device is issued as part of said identification number.

3. The cryptography key generator of claim 1 wherein said identification number generator forms said identification number by including an issuing company code signifying a company from which the corresponding remote communication device is issued as part of said identification number.

4. The cryptography key generator of claim 1 wherein said cryptography electronics is adapted to encrypt a function of at least part of said identification number with said at least one master encryption key to form a value used to arrive at said main remote communication device key.

5. The cryptography key generator of claim 4 wherein said function is f(x)=x.

6. The cryptography key generator of claim 4 wherein said function of at least part of said identification number is a result of taking an exclusive-OR of at least part of said identification number and a constant.

7. The cryptography key generator of claim 1 wherein said cryptography electronics creates said remote communication device key by:
   a. taking an exclusive-OR of at least part of said identification number and a constant stored in said memory to provide a first result;
   b. taking an exclusive-OR of said first result and a first master key to provide a second result;
   c. encrypting said second result with said first master key to provide a third result;
   d. taking an exclusive-OR of said third result and said first master key to provide a fourth result;
   e. taking an exclusive-OR of said fourth result and a second master key to provide a fifth result;
   f. decrypting said fifth result with said second master key to provide a sixth result;
   g. taking an exclusive-OR of said sixth result and said second master key to provide a seventh result;
   h. taking an exclusive-OR of said seventh result and a third master key to provide an eighth result;
   i. encrypting said eighth result with said third master key to provide a ninth result; and
   j. taking an exclusive-OR of said ninth result and said third master key to provide said remote communication device key.

8. The cryptography key generator of claim 1 wherein said cryptography electronics encrypts and decrypts according to The Data Encryption Standard (DES) and the master encryption key is a DES key.

9. A cryptograph key generator for generating keys used in remote communication devices comprising:
   a remote communication device identification number generator adapted to generate unique identification numbers for a plurality of remote communication devices,
   a memory having at least one master encryption key stored therein;
   cryptography electronics associated with a host processing system adapted to encrypt a function of an identification number using said at least one master encryption key to provide a main remote communication device key; and
   communication electronics associated with said cryptography electronics adapted to transmit said remote communication device identification number and said remote communication device key to a corresponding remote communication device,
   wherein said identification number generator includes an incremental sequence counter, said incremental sequence counter adapted to provide a tag sequence number used to form at least part of said identification number, and said identification number generator forms said identification number by combining said tag sequence number, said issuing company code signifying a company from which the corresponding remote communication device is issued and an industry code signifying a type of industry the issuing company is associated.

10. A cryptography key generator for generating keys used in remote communications devices comprising:
    a remote communication device identification number generator adapted to generate unique identification numbers for a plurality of remote communication devices;
    a memory having at least one master encryption key stored therein;
    cryptography electronics associated with a host processing system adapted to encrypt a function of an identification number using said at least one master encryption key to provide a main remote communication device key; and communication electronics associated with said cryptography electronics adapted to transmit said remote communication device identification number and said remote communication device key to a corresponding remote communication device;

wherein said cryptography electronics are adapted to encrypt a function of at least part of said identification number with a first master key to provide a first result and decrypt a function of said first result with another master key to provide another result used to arrive at said main remote communication device key.

11. A cryptography key generator for generating keys used in remote communications devices comprising:

a remote communication device identification number generator adapted to generate unique identification numbers for a plurality of remote communication devices;

a memory having at least one master encryption key stored therein;

cryptography electronics associated with a host processing system adapted to encrypt a function of an identification number using said at least one master encryption key to provide a main remote communication device key; and communication electronics associated with said cryptography electronics adapted to transmit said remote communication device identification number and said remote communication device key to a corresponding remote communication device;

wherein said cryptography electronics are adapted to encrypt a function of at least part of said identification number with a first master key to provide a first result and encrypt a function of said first result with another master key to provide another result used to arrive at said main remote communication device key.

12. A cryptography key generator for generating keys used in remote communications devices comprising:

a remote communication device identification number generator adapted to generate unique identification numbers for a plurality of remote communication devices;

a memory having at least one master encryption key stored therein;

cryptography electronics associated with a host processing system adapted to encrypt a function of an identification number using said at least one master encryption key to provide a main remote communication device key; and communication electronics associated with said cryptography electronics adapted to transmit said remote communication device identification number and said remote communication device key to a corresponding remote communication device;

wherein said cryptography electronics are adapted to encrypt a function of at least part of said identification number with a first master key to provide a first result; decrypt a function of said first result with a second master key to provide a second result and encrypt a function of said second result used to arrive at said main remote communication device key.

13. A cryptography key generator for generating keys used in remote communication devices comprising:

a remote communication device identification number generator adapted to generate unique identification numbers for a plurality of remote communication devices, a memory having at least one master encryption key stored therein;

cryptography electronics associated with a host processing system adapted to encrypt a function of an identification number using said at least one master encryption key to provide a main remote communication device key; and communication electronics associated with said cryptography electronics adapted to transmit said remote communication device identification number and said remote communication device key to a corresponding remote communication device, wherein said identification number generator includes an incremental sequence counter, said incremental sequence counter adapted to provide a tag sequence number used to form at least part of said identification number, and said identification number includes a standard industry code, issuing company identifier and a tag sequence number.

14. The cryptography key generator of claim 13 wherein said identification number is ten bytes having four bytes allocated for said standard industry code, two bytes allocated for said company identifier and four bytes for said tag sequence number.

15. The cryptography key generator of claim 13 wherein said at least part of said identification number includes said tag sequence number.

16. The cryptography key generator of claim 13 wherein said at least part of said identification number includes said tag sequence number and said issuing company identifier.

17. The cryptography key generator of claim 13 wherein said at least part of said identification number includes said tag sequence number, said issuing company identifier and part of said standard industry code.

18. A method of generating a cryptography key for a plurality of remote communication devices comprising:

a. generating a unique identification number for a remote communication device;

b. taking an exclusive-OR of at least part of the identification number and a constant to provide a first result;

c. taking an exclusive-OR of the first result and a first master key to provide a second result;

d. encrypting the second result with the first master key to provide a third result;

e. taking an exclusive-OR of the third result and the first master key to provide a fourth result;

f. taking an exclusive-OR of the fourth result and a second master key to provide a fifth result;

g. decrypting the fifth result with the second master key to provide a sixth result;

h. taking an exclusive-OR of the sixth result and the second master key to provide a seventh result;

i. taking an exclusive-OR of the seventh result and a third master key to provide an eighth result;

j. encrypting the eighth result with the third master key to provide a ninth result; and k. taking an exclusive-OR of the ninth result and the third master key to provide the remote communication device key.

19. The method of claim 18 wherein step a. includes:

generating a sequence number, and forming said identification number by combining the sequence number, an issuing company code and a standard industry code.

* * * * *